United States Patent
Oh et al.

(10) Patent No.: US 12,485,772 B2
(45) Date of Patent: Dec. 2, 2025

(54) TORQUE CONTROL METHOD IN DRIVE SYSTEM OF ELECTRIC VEHICLE

(71) Applicants: HYUNDAI MOTOR COMPANY, Seoul (KR); KIA CORPORATION, Seoul (KR)

(72) Inventors: Ji Won Oh, Hwaseong-si (KR); Ho Wook Lee, Seoul (KR); Jeong Soo Eo, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 127 days.

(21) Appl. No.: 18/601,061

(22) Filed: Mar. 11, 2024

(65) Prior Publication Data

US 2025/0187451 A1 Jun. 12, 2025

(30) Foreign Application Priority Data

Dec. 12, 2023 (KR) .......... 10-2023-0179265

(51) Int. Cl.
*B60L 15/20* (2006.01)

(52) U.S. Cl.
CPC ......... *B60L 15/20* (2013.01); *B60L 2240/423* (2013.01); *B60L 2260/28* (2013.01)

(58) Field of Classification Search
CPC .............. B60L 15/20; B60L 2240/423; B60L 2260/28; Y02T 10/72; Y02T 10/64; B60Y 2200/91
See application file for complete search history.

(56) References Cited

U.S. PATENT DOCUMENTS

2019/0291591 A1* 9/2019 Suzuki .................... B60L 3/104
2020/0070836 A1* 3/2020 Suzuki .................... B60L 15/20

FOREIGN PATENT DOCUMENTS

| KR | 10-1448746 B1 | 10/2014 |
| KR | 10-1704243 B1 | 2/2017 |
| KR | 2022-0096746 A | 7/2022 |

* cited by examiner

*Primary Examiner* — Behrang Badii
(74) *Attorney, Agent, or Firm* — MCDONNELL BOEHNEN HULBERT & BERGHOFF LLP

(57) ABSTRACT

A torque control method in a drive system of an electric vehicle includes determining, by a controller, a torque control mode corresponding to a current vehicle driving state among a plurality of preset torque control modes; and transitioning, by the controller, from a current torque control mode to the determined torque control mode, in which the transitioning to the determined torque control mode comprises performing, by the controller, limitation to a torque slope using a torque command at an immediately previous control cycle with respect to a front-wheel torque command that is a command for a front-wheel motor and a rear-wheel torque command that is a command for a rear-wheel motor, in a transient section where transition between torque control modes occurs.

20 Claims, 11 Drawing Sheets

TORQUE CONTROL METHOD IN DRIVE SYSTEM OF ELECTRIC VEHICLE

CROSS REFERENCE TO RELATED APPLICATIONS

This application claims, under 35 U.S.C. § 119(a), the benefit of priority from Korean Patent Application No. 10-2023-0179265 filed on Dec. 12, 2023, the entire contents of which are incorporated herein by reference.

BACKGROUND

(a) Technical Field

The present disclosure relates to relates to a torque control method in a drive system of an electric vehicle, and more specifically, to a torque control method capable of generating torque while avoiding a backlash band of a drive system in an electric vehicle.

(b) Background Art

In general, a vehicle's drive system must generate appropriate torque according to a torque command determined by a driver's driving input value (such as an accelerator pedal position sensor value or a brake pedal position sensor value) or demands of ADAS (Advanced Driver Assistance System).

Here, in a case where a torque change rate is set too large, problems such as deterioration of drivability may occur due to drive shaft torsion, gear backlash striking, or rapidly changing torque shock.

Conversely, in a case where the torque change rate is set too small, it takes excessive time to generate torque required by a driver or an ADAS controller, and an actual vehicle operation may differ from a driver's intention, thereby causing frustrating reactivity or dangerous situations.

In this way, there is a conflict between the degree of reduction of NVH (Noise, Vibration, and Harshness) in a vehicle due to rapid torque change and the degree of securing acceleration/deceleration responsiveness of the vehicle.

Currently, in mass-produced vehicles, in order to generate an optimal torque command capable of solving the above-mentioned conflict, torque slope (torque change rate) limits and filters that use various conditions as variables are used.

In addition, in an electric vehicle that uses a motor as a driving source or a part thereof, active feedback torque correction control may be applied to suppress vibration due to a backlash that has already occurred using the motor.

However, no matter how advanced the applied backlash post-correction control is, it is difficult to suppress the problem of low vehicle responsiveness, which inevitably occurs due to hardware characteristics. Moreover, NVH issues due to the backlash frequently occur in the electric vehicle with few vibration reducing elements in a drive system.

As a related prior art document, Korean Patent Publication No. 10-1704243 (Feb. 1, 2017) discloses a method of generating a model speed of a drive shaft using a disturbance observer and reducing vibration using a difference between the model speed of the drive shaft and an actual speed. The above patent document also discloses a method of calculating a model speed on the basis of a wheel speed instead of a disturbance observer in determining the model speed.

Korean Patent Publication No. 10-1448746 (Oct. 1, 2014) discloses a method of generating a model speed of a motor using an input torque model and reducing vibration using a difference between the model speed of the motor and an actual speed.

Korean Laid-open Patent Publication No. 10-2022-0096746 (Jul. 7, 2022) discloses a method of estimating a speed of a drive system using a torque model and determining a slope of a torque command using a speed difference between an actual speed of the drive system and the estimated speed.

However, all of the above-mentioned related arts only present a torque correction method for reducing and suppressing vibration generated in the drive system, and do not present a torque determination method capable of minimizing or preventing the occurrence of vibration.

Accordingly, in relation to the backlash of the drive system, it is desirable to provide, rather than a control method of alleviating problems caused by the backlash, a control method capable of generating a torque command while avoiding a backlash band in which backlash of the drive system may occur.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to solve the above-described problems associated with prior art. An object of the present disclosure is to provide a torque command generation method and a torque control method in a drive system of an electric vehicle, capable of generating torque while avoiding a backlash band to prevent occurrence of backlash in the drive system.

In addition, another object of the present disclosure is to provide a torque command generation method and a torque slope control method for generating the torque command, in a switching (transition) situation between modes, capable of improving and minimizing the backlash problem while securing driving performance and drivability of the vehicle.

The objects of the present disclosure are not limited thereto, and other objects will be clearly understood by those skilled in the art in the technical field to which the present disclosure pertains from the description below.

In one aspect, the present disclosure provides a torque control method in a drive system of an electric vehicle including determining, by a controller, a torque control mode corresponding to a current vehicle driving state among a plurality of preset torque control modes, and transitioning, by the controller, from a current torque control mode to the determined torque control mode, in which the transitioning to the determined torque control mode comprises performing, by the controller, limitation to a torque slope using a torque command at an immediately previous control cycle with respect to a front-wheel torque command that is a command for a front-wheel motor and a rear-wheel torque command that is a command for a rear-wheel motor, in a transient section where the transition between the torque control modes is made.

Other aspects and preferred embodiments of the disclosure are discussed infra.

It is to be understood that the term "vehicle" or "vehicular" or other similar terms as used herein are inclusive of motor vehicles in general such as passenger automobiles including sport utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example, vehicles powered by both electricity and gasoline.

BRIEF DESCRIPTION OF THE FIGURES

The above and other features of the present disclosure will be described in detail with reference to certain exemplary embodiments thereof illustrated the accompanying drawings which are given hereinafter by way of illustration only, and thus are not limitative of the present disclosure, and wherein.

Figure 1:
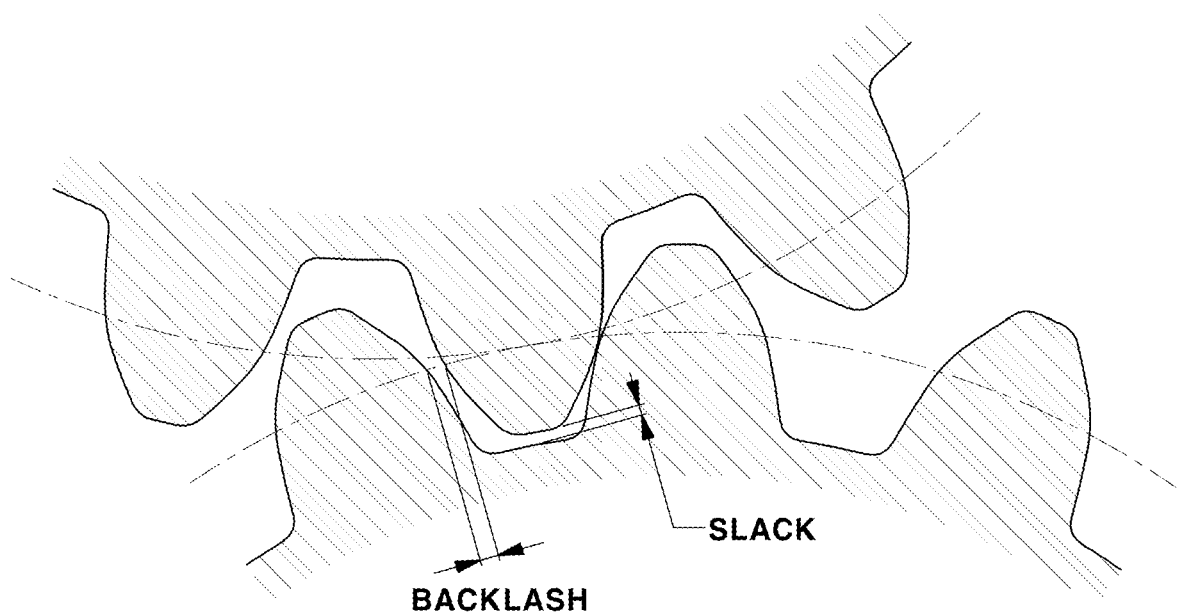
FIG. 1 is a diagram illustrating backlash.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter, reference will be made in detail to various embodiments of the present disclosure, examples of which are illustrated in the accompanying drawings and described below. While the disclosure will be described in conjunction with exemplary embodiments, it will be understood that the present description is not intended to limit the disclosure to the exemplary embodiments. In addition, the disclosure should not be construed as being limited to the embodiments described in this specification, and should be understood to include all changes, equivalents, and substitutes included in the spirit and technical scope of the present disclosure.

On the contrary, the disclosure is intended to cover not only the exemplary embodiments, but also various alternatives, modifications, equivalents and other embodiments, which may be included within the spirit and scope of the disclosure as defined by the appended claims. It will be understood that, although the terms "first", "second", etc. may be used herein to describe various elements, these elements should not be limited by these terms. These terms are only used to distinguish one element from another. For example, a first element may be termed a second element, and, similarly, a second element may be termed a first element, without departing from the scope of the exemplary embodiments of the present disclosure.

In addition, it will be understood that, when an element is "connected" or "coupled" to another element, it may be directly connected or coupled to the other element, or may be indirectly connected or coupled to the other element with a different element being interposed therebetween. In contrast, when an element is "directly connected" or "directly coupled" to another element, this means that there is no intervening element therebetween. Other words used to describe the relationship between elements should be interpreted in a similar manner (for example, "between" and "directly between", "adjacent" and "directly adjacent", etc.).

Wherever possible, the same reference numbers will be used throughout the drawings to refer to the same or like parts. The terminology used herein is for the purpose of describing particular embodiments only and is not intended to limit exemplary embodiments of the disclosure. As used herein, the singular forms "a", "an", and "the" are intended to include the plural forms as well, unless the context clearly indicates otherwise. It will be further understood that the terms "comprise", "include", and "have" used herein specify the presence of stated components, steps, operations, and/or elements, but do not preclude the presence or addition of one or more other components, steps, operations, and/or elements.

The present disclosure relates to a torque control method in a drive system of an electric vehicle, capable of generating torque in the drive system while avoiding a backlash band so that the occurrence of the backlash in the drive system can be minimized or prevented in advance, rather than alleviating problems caused by the backlash in the drive system.

In the present disclosure, a method of dividing driving torque ranges of a front-wheel motor and a rear-wheel motor is basically used to generate torque in order to avoid the backlash band in the drive system.

In the present disclosure, the backlash band may be defined as a torque range where a backlash may occur in the vehicle's drive system. Here, the vehicle's drive system includes driving elements such as a drive unit that drives the vehicle, driving wheels, a drive shaft, a reducer, a differential and an axle between the drive unit and the driving wheels, and the like.

In the present disclosure, the above-mentioned drive system includes a front-wheel drive system between a front-wheel drive unit (front-wheel motor) and front-wheels, and a rear-wheel drive system between a rear-wheel drive unit (rear-wheel motor) and rear-wheels.

In the following description, the term "torque" includes both torque that is input to the drive system by the drive unit and is transmitted and applied to the driving wheels, and torque that is transmitted and applied from the driving wheels to the drive unit through the drive system.

In addition, in the following description, the term "torque" includes both of a driving torque (acceleration torque) that accelerates a vehicle and a braking torque (deceleration torque) that decelerates the vehicle. Here, the braking torque includes a regenerative torque caused by a motor and a friction braking torque caused by a friction brake system.

In this specification, unless specified separately as the driving torque and the braking torque, depending on driving situations of the vehicle, torque may be the driving torque that accelerates the vehicle (acceleration situation) or the braking torque that decelerates the vehicle (deceleration situation). However, a motor torque that decelerates the vehicle is the regenerative torque.

In this specification, the driving torque and a driving torque command correspond to torque that accelerates the vehicle, and are defined as torque having a positive (+) value and a positive direction. On the other hand, the braking torque and a braking torque command correspond to torque that decelerates the vehicle, and are defined as torque having a negative (−) value or a negative direction.

In the following description, a front-wheel torque command and a rear-wheel torque command are motor torque commands (front-wheel motor torque command and rear-wheel motor torque command). In a case where a torque value of each command represents a negative (−) value, the command is a regenerative torque command to a corresponding motor.

A positive (+) direction torque or a negative (−) direction torque is applied to the drive system depending on whether the vehicle during driving is accelerating or decelerating, and the direction of the torque input to the drive system and transmitted through the drive system may be changed according to a vehicle's driving situation.

The present disclosure is made based on the principle that problems caused by backlash in a vehicle's drive system mainly occur only in a torque range close to 0. The torque range close to 0 may be referred to as a backlash band where backlash problems may occur.

In the present disclosure, the backlash band may be set as a torque range bordering a lower limit threshold that has a negative (−) value and an upper limit threshold that has a positive (+) value. In other words, the backlash band may be set to a torque range including 0. Here, a backlash state may occur when input torque applied from the motor that is a drive unit to the drive system or from the driving wheels to the drive system enters a set backlash band.

In the following description, invasion or entry into the backlash band occurs when a torque value of a corresponding torque command becomes a torque value within the backlash band, and passage through the backlash band occurs when the torque value of the torque command invades the backlash band from outside the backlash band, continuously increases or decreases, and then, escapes the backlash band again.

Here, "backlash" refers to a gap that exists between engaged gear teeth of two gears, as shown in FIG. 1. Between two engaged gears, the backlash may cause vibration or noise as the gear teeth hit each other, and in the worst case, the backlash may cause gear damage.

When torque is continuously applied in one direction, since one of two engaged gears continues to transmit force to the other in the same direction, the teeth of the two engaged gears remain aligned and engaged in one direction, and in this case, there are no problems due to the backlash gap.

However, when the direction of the torque changes, the direction of the force transmission changes, and the gear teeth are aligned in the reverse direction after passing through the backlash gap. Here, after the teeth are aligned in the reverse direction, since the engagement of the gears is not released while the force in the same direction is being transmitted through the teeth, problems due to backlash do not occur.

However, at the moment when the force transmission direction changes, problems due to backlash occur when the teeth of two gears are disengaged and then engaged again after passing through the backlash gap.

Accordingly, the key to preventing the backlash problems is to eliminate or minimize situations in which gears are disengaged, and this can be achieved by eliminating or minimizing direction change of a torque command to a drive unit such as a motor.

In order to eliminate or minimize the direction change of the torque command, a method of causing the front- and rear-wheel drive units, that is, the front-wheel motor and the rear-wheel motor, to share the roles, and to this end, dividing torque operation ranges in the front-wheel motor and the rear-wheel motor may be considered.

However, in applying this control, the maximum acceleration performance may be limited, and thus, switching of the torque control mode is necessary to resolve this limitation. The present disclosure provides an effective mode switching method. In addition, the present disclosure provides a method of generating an optimal torque command in a switching situation (transition situation) between modes and controlling a torque slope for generating the optimal torque command.

Figure 2:
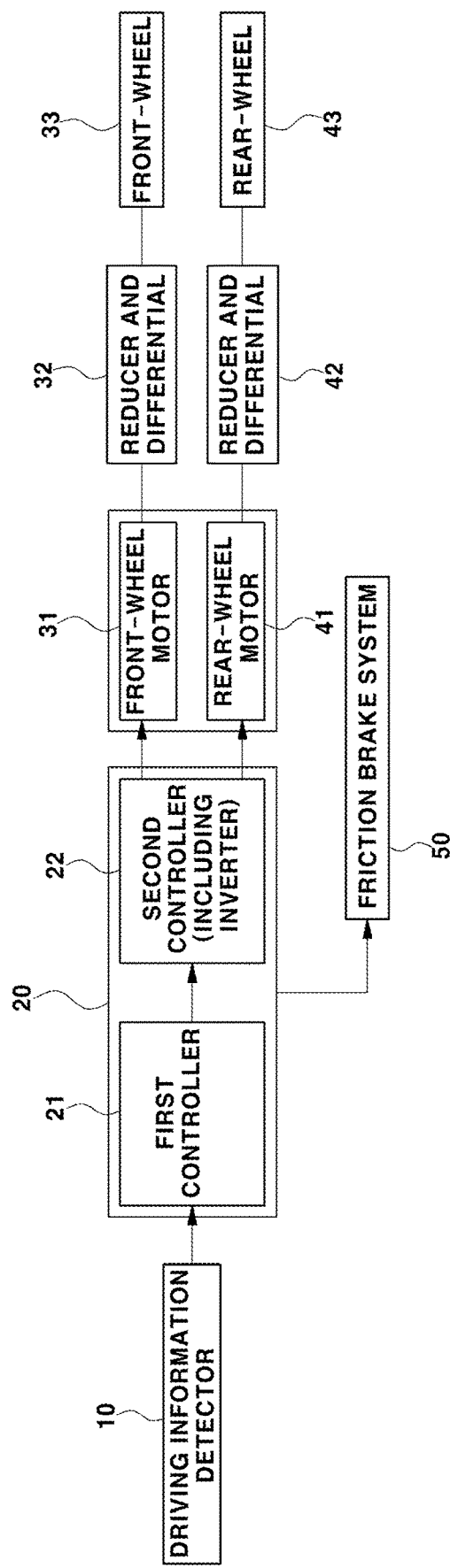
FIG. 2 is a block diagram showing a configuration of a device that performs a drive system torque control process according to an embodiment of the present disclosure.

FIG. 2 is a block diagram showing a configuration of a device that performs a drive system torque control process according to an embodiment of the present disclosure.

The present disclosure may be applied to a vehicle equipped with a plurality of drive units that drive the vehicle, and may be applied to a vehicle in which front-wheels 33 and rear-wheels 43 are driven by independent drive units, respectively.

Specifically, the present disclosure may be applied to a vehicle equipped with a front-wheel drive unit that applies torque to the front-wheels 33 and a rear-wheel drive unit that applies torque to the rear-wheels 43. Here, the front-wheels 33 and the rear-wheels 43 are both driving wheels connected to the drive units for power transmission.

In addition, the present disclosure may be applied to a vehicle in which both the front-wheel drive unit and the rear-wheel drive unit are motors. In the following description, a motor 31 that is a front-wheel drive unit is referred to as a "front-wheel motor", and a motor 41 that is a rear-wheel drive unit is referred to as a "rear-wheel motor".

Referring to FIG. 2, the front-wheel motor 31 and the rear-wheel motor 41 are shown as drive units of an electric vehicle. The front-wheel motor 31 and the rear-wheel motor 41 are connected to transmit power to the front-wheels 33 and the rear-wheels 43, which are the driving wheels, through drive system elements such as reducers and differentials 32 and 42, and axles, respectively.

Accordingly, torque output from the front-wheel motor 31 and the rear-wheel motor 41 may be transmitted to the front-wheels 33 and the rear-wheels 43 through the drive system elements such as the reducers and differentials 32 and 42, and axles.

In addition, although not shown in FIG. 2, a battery is connected to the front-wheel motor 31 and the rear-wheel motor 41 via an inverter to enable charging and discharging. The inverter may include a front-wheel inverter (not shown) for driving and controlling the front-wheel motor 31 and a rear-wheel inverter (not shown) for driving and controlling the rear-wheel motor 41.

In the electric vehicle, operations (driving and regeneration) of the front-wheel motor 31 and the rear-wheel motor 41 are controlled according to a torque command generated by the controller 20. The controller 20 determines a demand torque according to a vehicle driving state, and generates a final torque command (total torque command) on the basis of the demand torque.

In addition, the controller 20 determines a torque command for each motor, that is, a front-wheel torque command and a rear-wheel torque command, from a final torque command, and controls the operations of the front-wheel motor 31 and the rear-wheel motor 41 through the inverter on the basis of the above determination. In a case where the front-wheel torque command and the rear-wheel torque command are positive (+) values, such a command is defined as a positive (+) direction torque command that accelerates the vehicle. In a case where the front-wheel torque command and the rear-wheel torque command are negative (−) values, such a command is defined as a regenerative torque command that is a negative (−) direction torque that decelerates the vehicle.

The final torque command is a total torque command for generating the demand torque for vehicle driving through the motor (or the motor and the friction brake system), and is a pre-distribution torque command before torque distribution to the front- and rear-wheels is performed. In the following description, pre-distribution torque command, sum torque command, and total torque command have the same meaning.

In the present disclosure, the controller 20 includes a first controller 21 that determines the demand torque for vehicle driving on the basis of a driving input value of a driver or receives the demand torque from another controller such as an ADAS (Advanced Driver Assistance System) controller, and generates and outputs a front-wheel torque command and a rear-wheel torque command, which are torque commands for respective motors (for respective axles) on the basis of the demand torque, and a second controller 22 that controls the operations of the front-wheel motor 31 and the rear-wheel motor 41 according to the final torque command input through the first controller 21.

The first controller 21 may be a vehicle control unit (VCU) that determines and generates overall torque commands necessary for vehicle driving in a typical vehicle. Since methods and processes of determining a torque command in a vehicle are well-known in the relevant technical field, detailed description thereof will be omitted.

The first controller 21 may determine a front-wheel torque command and a rear-wheel torque command from the total torque command through a front-wheel and rear-wheel torque distribution process. Here, the front-wheel torque command and the rear-wheel torque command are torque commands for the respective axles, and are both motor torque commands. The front-wheel torque command is a torque command for the front-wheel motor 31, and the rear-wheel torque command is a torque command for the rear-wheel motor 41.

Accordingly, in a case where the front-wheel torque command and the rear-wheel torque command are output from the first controller 21, the second controller 22 receives the same and controls the operations of the front-wheel motor 31 and the rear-wheel motor 41 through the front-wheel inverter and the rear-wheel inverter.

As a result, torque output by the front-wheel motor 31 is applied to the front-wheels 33 through the reducer and differential 32 of the front-wheel drive system, and torque output by the rear-wheel motor 41 is applied to the rear-wheels 43 through the reducer and differential 42 of the rear-wheel drive system.

The second controller 22 may be a typical motor control unit (MCU) that controls an operation of a driving motor through an inverter according to a torque command output from the vehicle control unit (VCU) in the electric vehicle.

In the above description, the control subject is divided into the first controller 21 and the second controller 22, but instead, the torque control process according to the present disclosure may be performed by a single integrated control element.

Each of a plurality of controllers integrated in the single control element may be referred to as a controller, and the torque control process according to the present disclosure to be described below may be performed by the controller.

In the present disclosure, vehicle driving information, indicating vehicle driving states, such as driver's driving input values input to the controller 20 may include sensor detection information that is detected by a driving information detector 10 and is input to the controller 21 through a vehicle network.

Here, the driving information detector 10 may include an accelerator position sensor (APS) that detects a driver's accelerator position sensor value (APS value, %), a brake pedal position sensor (BPS) that detects a driver's brake pedal position sensor value (BPS value, %), a sensor that detects a drive system speed, and a sensor that detects a vehicle speed.

Here, the drive system speed may be rotational speeds of the front-wheel motor 31 and the rear-wheel motor 41, which are the driving motors, or rotational speeds (wheel speeds) of the driving wheels 33 and 43. Here, the sensor that detects the drive system speed may be a sensor that detects the rotational speed of each of the motors 31 and 41, and may be a typical resolver that detects a rotor position of the motor. Alternatively, the sensor that detects the drive system speed may be a typical wheel speed sensor that detects rotational speeds (wheel speeds) of the driving wheels 33 and 43.

Further, the sensor that detects the vehicle speed may also be the wheel speed sensor. Since a technique of obtaining vehicle speed information from a signal from the wheel speed sensor is well-known in the relevant technical field, detailed description thereof will be omitted.

As the vehicle driving information for determining and generating demand torque and a torque command in the controller 21, the driver's accelerator position sensor value (APS value, %), the driver's brake pedal position sensor value (BPS value, %), the rotational speeds of the motor 31 and 41, the rotational speeds of the driving wheels 33 and 43, the vehicle speed, and the like, detected by the driving information detector 10, may be selectively used.

In the vehicle driving information, the accelerator position sensor value (APS value) and the brake position sensor value (BPS value), which are the driver's driving input values, may be driver's driving input information, and the rotational speeds of the motor 31 and 41, and the rotational speeds of the driving wheels 33 and 41, and the vehicle speed, detected by the driving information detector 10, may be vehicle state information.

In addition, the vehicle driving information may include information determined by the controller 20 itself in a broad sense, and may further include information (for example, demand torque information) input to the controller 20 from another controller in the vehicle (for example, ADAS controller) through the vehicle network.

In FIG. 2, reference numeral 50 represents a friction brake system of the vehicle, which may be a general hydraulic brake system, or may be a front-wheel friction brake system that applies a friction braking torque to the front-wheel 31 or a friction brake system that applies a friction braking torque to the rear-wheel 43.

Further, the present disclosure provides a method of generating a torque command while avoiding a backlash band where backlash of a drive system may occur. Here, avoidance of the backlash band means preventing a situation where the torque command invades the backlash band as much as possible.

This may be achieved by a method of maintaining only negative (−) torque values for the front-wheel torque and the front-wheel torque command, and maintaining only positive (+) torque values for the rear-wheel torque and the rear-wheel torque command. As described above, the backlash issue has the characteristic of occurring when the direction of torque changes.

In applying such a control strategy, in the rear-wheel drive system, gears are continuously aligned in a positive (+) torque transmission direction to avoid entering the backlash band, which may be achieved by continuously generating at least a small amount of positive (+) direction torque.

Here, the small amount of positive (+) direction torque for continuously aligning the gears in the positive (+) torque transmission direction may be defined as a minimum rear-wheel torque threshold (positive value), and the rear-wheel torque command value (positive value) during the backlash band avoidance control may be set in a range of a preset minimum rear-wheel torque threshold or greater.

Similarly, in the front-wheel drive system, gears are continuously aligned in a negative (−) torque transmission direction to avoid entering the backlash band, which may be achieved by continuously generating at least a small amount of negative (−) direction torque.

Here, the small amount of negative (−) direction torque for continuously aligning the gears in the negative (−) torque transmission direction may be defined as a maximum front-wheel torque threshold (negative value), and the front-wheel torque command value (negative value) during the backlash band avoidance control may be set in a range of a preset maximum front-wheel torque threshold or greater.

In the present embodiment, the minimum rear-wheel torque threshold may be set as a torque value outside the backlash band, which is a torque range where a backlash may occur in the rear-wheel drive system, in the controller 20. That is, the minimum rear-wheel torque threshold may be set to a value greater than an upper limit threshold of the backlash band in the rear-wheel drive system.

Similarly, the maximum front-wheel torque threshold may be set as a torque value outside the backlash band, which is a torque range where a backlash may occur in the front-wheel drive system, in the controller 20. Here, the maximum front-wheel torque threshold may be set to a value smaller than a lower limit threshold of the backlash band in the front-wheel drive system, in the controller 20.

However, a problem that may occur with this method is that, since only one of the front- and rear-wheel motors is used for acceleration and regenerative braking (deceleration), the maximum output may be insufficient compared with the case where both the motors are used for all purposes.

That is, since only one of the front-wheel motor 31 and the rear-wheel motor 41 is used, compared with the case where both the front-wheel motor 31 and the rear-wheel motor 41 are used for acceleration or for regenerative braking, the maximum output may be insufficient. This may make it difficult to achieve maximum acceleration performance or to achieve maximum regenerative braking.

However, as a basic principle, during acceleration, the load movement is concentrated on the rear-wheel side and the torque of the rear-wheel shaft plays a main role, and conversely, during deceleration, the load movement is concentrated on the front-wheel side and the regenerative torque of the front-wheel shaft plays a main role. In consideration of this principle, the backlash band avoidance strategy proposed in the present disclosure does not result in significant performance degradation.

Nevertheless, it is obvious that the performance in a case where only one shaft motor is used is lower than the maximum performance in a case where both the shaft motors are used together. In order to solve this limitation, a method of selecting a mode and appropriately switching between modes according to a vehicle driving state may be considered.

First, a reverse distribution mode is set in the controller 20, and the reverse distribution mode may be selectively performed by the controller 20. The reverse distribution mode may be a responsiveness priority mode that prioritizes vehicle acceleration/deceleration responsiveness, and may be a backlash band avoidance mode in which the backlash band avoidance control is performed. In the reverse distribution mode, reverse distribution control is performed for distributing torque commands in opposite directions to the front- and rear-wheels and applying torque in opposite directions.

Further, unlike the reverse distribution mode, a co-directional distribution mode capable of generating a maximum output is set in the controller 20, and the co-directional distribution mode may be a general torque control mode applied to a typical vehicle. In the co-directional distribution mode (output priority mode, normal mode), when the vehicle accelerates and regenerates, the torque command in the same direction is distributed to the front- and rear-wheels, and the torque in the same direction is applied.

As described above, in the present embodiment, the torque distribution to the front- and rear-wheels may be one of the co-directional distribution and the reverse distribution. The co-directional distribution is to distribute and apply the torque in the same direction to the front- and rear-wheels, and the reverse distribution is to distribute and apply the torque in the opposite directions to the front- and rear-wheels.

In other words, in the co-directional distribution, the front-wheel motor and the rear-wheel motor are controlled to generate the torque in the same direction (both positive (+) torque values or both negative (−) torque values), and the front-wheel motor and the rear-wheel motor generate the torque in the same direction. Accordingly, the front-wheel torque and rear-wheel torque are added, thereby making it possible to generate the maximum torque.

However, in the co-directional distribution, when the demand torque passes 0, that is, when the direction and sign ('+' or '−') of the demand torque change, the torque command passes through the backlash band, and as a result, due to control (torque slope limitation) characteristics when passing through the backlash band, there occurs a delay in vehicle acceleration/deceleration responsiveness.

On the other hand, in the reverse distribution, the front-wheel motor and the rear-wheel motor are controlled to generate the torque in the opposite directions, for example, the front-wheel motor generates negative (−) torque and the rear-wheel motor generates positive (+) torque. Accordingly, the rear-wheel motor is responsible for generation of driving torque for vehicle acceleration, and the front-wheel motor is responsible for generation of regenerative torque for vehicle deceleration (regenerative braking).

That is, since the front-wheel torque command for controlling the operation of the front-wheel motor 31 is constantly determined and generated as a negative (−) torque value, and the rear-wheel torque command for controlling the operation of the rear-wheel motor 41 is constantly determined and generated as a positive (+) torque value, the torque command does not need to pass through the backlash band during the reverse distribution, and there is no need to limit the slope of the torque command in the backlash band. Thus, it is possible to improve vehicle acceleration/deceleration responsiveness.

In the present embodiment, in a case where the demand torque (sum demand torque) is in the positive (+) direction (acceleration direction, driving direction), the driving torque for vehicle acceleration must be generated, and thus, the reverse distribution control in the acceleration direction is performed. Here, the torque command for the front-wheel motor (front-wheel torque command) is determined as a torque command in the negative (−) direction.

In addition, an absolute value of the front-wheel torque command is determined as a minimum value where the gear teeth in the front-wheel drive system can maintain an aligned state for avoiding backlash. Here, the minimum value refers to the maximum front-wheel torque threshold, and the maximum front-wheel torque threshold may be a value that varies in real time depending on a status of the drive system.

In addition, the torque command for the rear-wheel motor (rear-wheel torque command) may be determined as a torque command in the positive (+) direction, and the rear-wheel torque command may be determined as a value obtained by subtracting the front-wheel torque command from the total torque command (sum torque command, i.e., a torque command before distribution).

Similarly, in a case where the demand torque (sum demand torque) is in the negative (−) direction (deceleration direction, regenerative direction), since the regenerative torque for vehicle deceleration must be generated, the reverse distribution control in the regenerative direction is performed. Here, the torque command for the rear-wheel motor (rear-wheel torque command) is determined as a torque command in the positive (+) direction.

Here, an absolute value of the rear-wheel torque command is determined as a minimum value where the gear teeth in the rear-wheel drive system can maintain an aligned state for avoiding backlash. Here, the minimum value refers to the minimum rear-wheel torque threshold, and the minimum rear-wheel torque threshold may be a value that varies in real time depending on a status of the drive system.

In addition, the torque command for the front-wheel motor (front-wheel torque command) may be determined as a torque command in the negative (−) direction, and the front-wheel torque command may be determined as a value obtained by subtracting the rear-wheel torque command from the total torque command (sum torque command, i.e., the torque command before distribution).

Here, the status of the drive system may include input torque applied to the drive system by the motor that drives the vehicle. Further, the input torque may be one of a total torque command, a motor torque estimation value estimated by a motor control unit, a motor torque detection value detected by a torque sensor, a value obtained by applying a filter to the total torque command, a value obtained by applying a filter to the motor torque estimation value, and a value obtained by applying a filter to the motor torque detection value.

Alternatively, the input torque may be a front-wheel torque command and a rear-wheel torque command determined by a typical front- and rear-wheel torque distribution process of distributing the total torque command according to a front- and rear-wheel distribution ratio. Here, the maximum front-wheel torque threshold may vary as a value corresponding to the distributed front-wheel torque command, and the minimum rear-wheel torque threshold may vary as a value corresponding to the distributed rear-wheel torque command.

According to this reverse distribution, it is not possible to generate the maximum driving force or maximum regenerative braking force by the motor, but it is possible to achieve relatively immediate acceleration/deceleration response in every situation.

Figure 3:
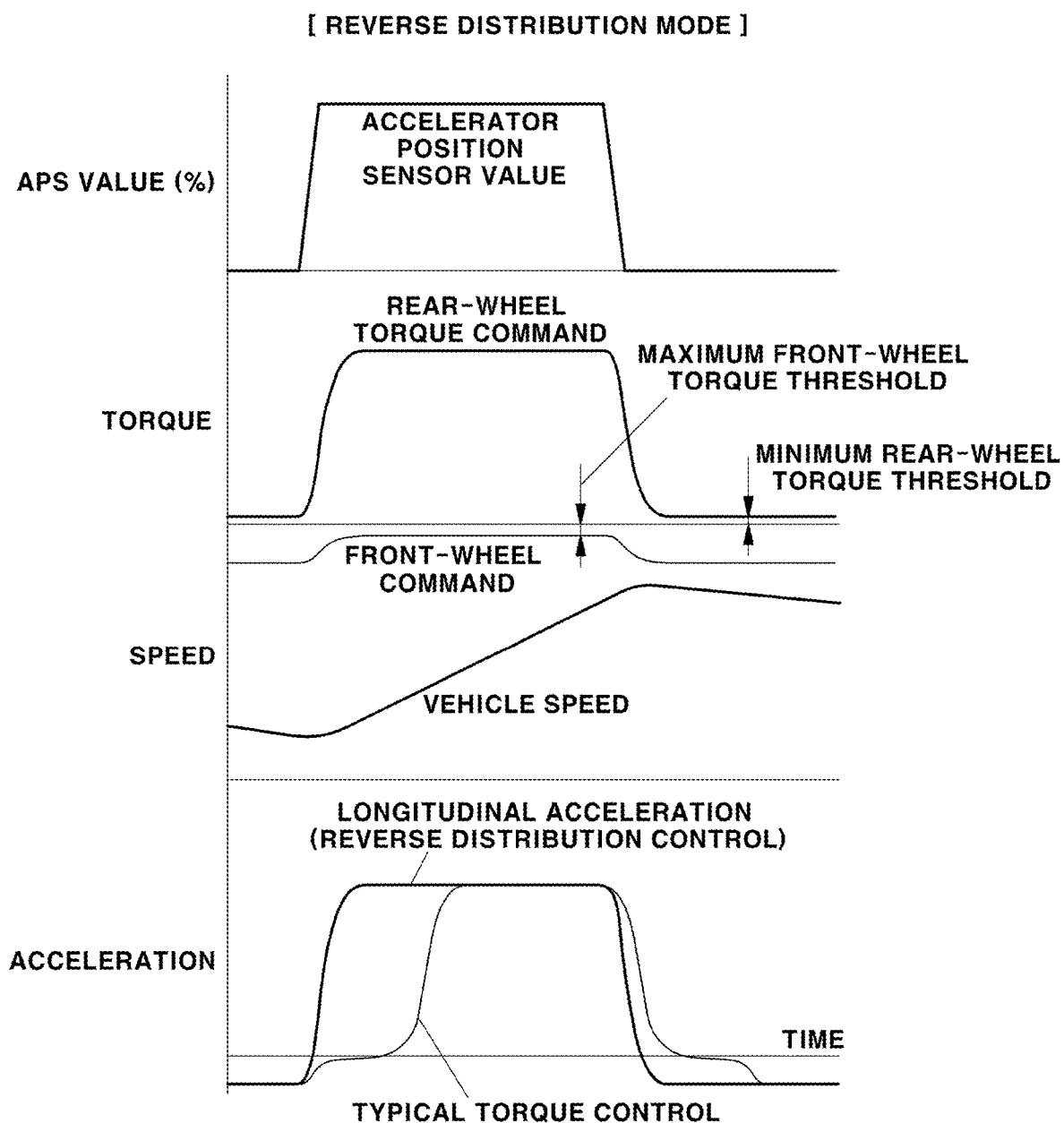
FIG. 3 is a diagram illustrating a control state in switching from a reverse distribution mode in a regenerative direction to a reverse distribution mode in an acceleration direction according to an embodiment of the present disclosure.

FIG. 3 is a diagram illustrating the control state when switching from the reverse distribution mode in the regenerative direction to the reverse distribution mode in the acceleration direction according to the present disclosure. Referring to FIG. 3, torque control in the reverse distribution mode is performed by the controller 20. The torque control state will be briefly described through comparison with the co-directional distribution mode. In the example of FIG. 3, a brake pedal, which is not shown, is off.

As shown in FIG. 3, zero-crossing of the torque command is unnecessary in switching between reverse distribution modes. Referring to the example of FIG. 3, the reverse distribution mode in the regenerative direction is performed by the controller 20 in a state where both the accelerator pedal and the brake pedal are off, and switches to the reverse distribution mode in the acceleration direction when the driver presses the accelerator pedal.

In FIG. 3, the reverse distribution mode in the acceleration direction is a mode that is performed in a case where the demand torque determined by the controller 20 corresponding to the accelerator position sensor value (APS value) does not exceed a preset mode switching threshold.

In the present embodiment, the reverse distribution mode in the regenerative direction or the reverse distribution mode in the acceleration direction may be selected by the controller 20 according to the vehicle driving information including the pedal position sensor value. During the reverse distribution mode in the regenerative direction, the controller 20 performs the backlash band avoidance control for limiting the rear-wheel torque command (positive value) to be equal to or greater than the minimum rear-wheel torque threshold (positive value). Further, during the reverse distribution mode in the acceleration direction, the controller 20 performs the backlash band avoidance control for limiting the front-wheel torque command (positive value) to be equal to or smaller than the maximum front-wheel torque threshold (positive value).

In the reverse distribution mode, the front-wheel motor 31 and the rear-wheel motor 41 do not generate the driving force in the same direction or the regenerative braking force in the same direction, and the front-wheel motor 31 performs only regeneration and the rear motor 41 only performs driving. Accordingly, it is not possible to drive and regenerate the vehicle at the maximum output.

Instead, in the reverse distribution mode, unlike the co-directional distribution mode, since zero-crossing of the front-wheel torque command or the rear-wheel torque command passing 0 torque in the backlash band is unnecessary, it is possible to secure responsiveness.

In contrast, in the co-directional distribution mode, as will be described later, since the front-wheel motor 31 and the rear-wheel motor 41 cooperate with each other for driving or regeneration, it is possible to drive or regenerate the vehicle at maximum output. However, in the co-directional distribution mode, zero-crossing of torque is unavoidable, which may result in responsiveness delay.

However, there is no difference between the reverse distribution mode and the co-directional distribution mode in that the front-wheel torque command and the rear-wheel torque command are determined so that the sum of the front-wheel torque command and the rear-wheel torque command is a value that follows the total torque command.

As described above, in the reverse distribution mode according to the present embodiment, control is performed so that the direction of each torque output by the front-wheel motor 31 and the rear-wheel motor 41 and transmitted through the drive system constantly maintains the same direction without change, in both a deceleration situation (reverse distribution mode in the regenerative direction) and an acceleration situation (reverse distribution mode in the acceleration direction) of the vehicle.

Here, the front-wheel torque command is always determined as a negative (−) torque value, and the rear-wheel torque command is always determined as a positive (+) torque value. Accordingly, the front-wheel motor 31 continues to provide negative (−) torque to the drive system and the rear-wheel motor 41 continues to apply positive (+) torque to the drive system during vehicle driving.

Additionally, in the reverse distribution mode, the front-wheel torque command and the rear-wheel torque command are determined by the controller 20 so that a torque value obtained by adding the front-wheel torque command and the rear-wheel torque command becomes the total torque command value.

More specifically, in the example of FIG. 3, the reverse distribution mode in the regenerative direction is selected by the controller 20 when both the accelerator pedal and the brake pedal are in the off state. In the reverse distribution mode in the regenerative direction, the demand torque and the total torque command have a negative (−) value as the regenerative torque, and at this time, the vehicle is in a decelerating state.

However, in the reverse distribution mode in the regenerative direction, as can be seen in FIG. 3, the rear-wheel torque command is determined as the minimum rear-wheel torque threshold set to the positive (+) torque value corresponding to the driving direction, and at this time, the front-wheel torque command is determined as a value obtained by subtracting the minimum rear-wheel torque threshold (positive torque) from the total torque command (negative torque).

The front-wheel torque command determined in this way has a negative (−) torque value. Accordingly, the rear-wheel motor 41 outputs positive (+) torque and applies the same to the drive system, and the front-wheel motor 31 outputs negative (−) torque and applies the same to the drive system.

Then, when the driver depresses the accelerator pedal, the mode is switched to the reverse distribution mode in the acceleration direction, and then, the reverse distribution mode in the acceleration direction is maintained while the demand torque (total torque command) is equal to or smaller than a mode switching threshold.

However, although not shown in FIG. 3, in the reverse distribution mode in the acceleration direction, when the demand torque (total torque command) exceeds the mode switching threshold, the mode is switched to the co-directional distribution mode in the acceleration direction, which will be described later.

After the driver presses the accelerator pedal and the mode is switched to the reverse distribution mode in the acceleration direction, the front-wheel torque command is determined as the maximum front-wheel maximum torque threshold set as a negative (−) torque value in the regenerative direction, and at this time, the rear-wheel torque command is determined as a positive (+) torque value obtained by subtracting the maximum front-wheel torque threshold (negative torque) from the total torque command (positive torque) corresponding to the accelerator position sensor value. In other words, the rear-wheel torque command is a positive (+) torque value obtained by adding an absolute value of the maximum front-wheel torque threshold to the total torque command.

In the reverse distribution mode in the acceleration direction, since the front-wheel torque command is limited to the maximum front-wheel torque threshold, torque compensation is performed for adding a positive (+) torque corresponding to a limited amount of front-wheel torque to the rear-wheel torque command to satisfy the total torque command.

Similarly, in the reverse distribution mode in the above-mentioned regenerative direction, since the rear-wheel torque command is limited to the minimum rear-wheel torque threshold, torque compensation is performed for adding a negative (−) torque corresponding to a limited amount of rear-wheel torque to the front-wheel torque command (negative value) to satisfy the total torque command.

Then, when the driver releases the accelerator pedal again, the rear-wheel torque command is again determined as the minimum rear-wheel torque threshold, and the front-wheel torque command is determined as a negative (−) torque value obtained by subtracting the rear-wheel torque command (minimum rear-wheel torque threshold) that is a positive (+) value, from the total torque command (negative torque) that is the regenerative torque.

After the front-wheel torque command and the rear-wheel torque command are determined as described above, the controller 20 controls the operations of the front-wheel motor 31 and the rear-wheel motor 41 according to the front-wheel torque command and the rear-wheel torque command.

Figure 4:
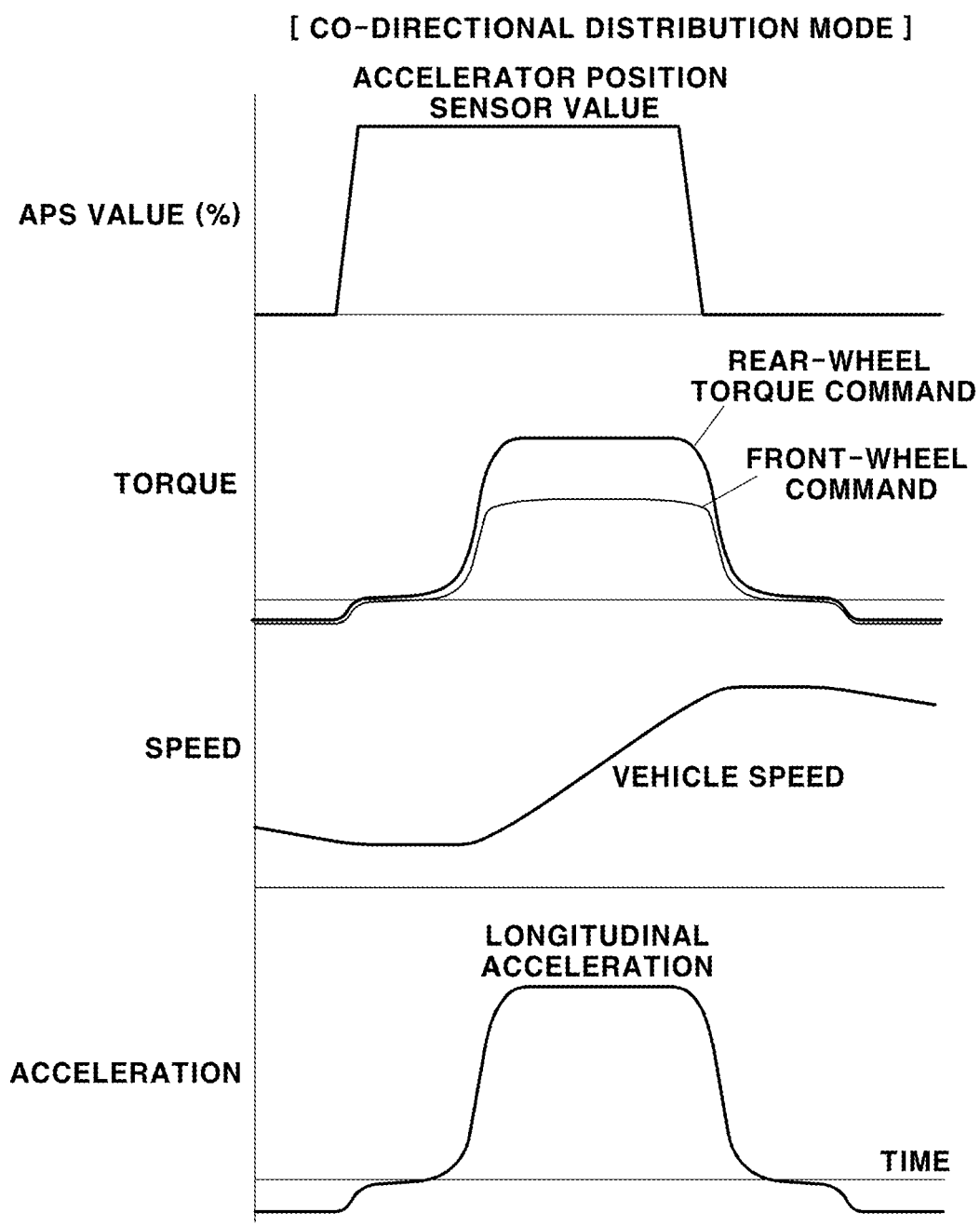
FIG. 4 is a diagram illustrating a state of a co-directional distribution mode according to an embodiment of the present disclosure.

FIG. 4 is a diagram illustrating a state of the co-directional distribution mode in the present embodiment.

In the present embodiment, the co-directional distribution mode (output priority mode, normal mode) has no difference compared with a general torque control mode. In entering the co-directional distribution mode, the front-wheel motor 31 and the rear-wheel motor 41 cooperate with each other for driving or regeneration, thereby making it possible to drive or regenerate the vehicle at maximum output.

However, in the co-directional distribution mode after the reverse distribution mode is released, zero-crossing of the torque is unavoidable, which may result in responsiveness delay.

In the co-directional distribution mode, in order to satisfy the demand torque with the torque applied by the front-wheel motor and rear-wheel motor, the front-wheel torque command and the rear-wheel torque command are determined and used in the overall torque range including a positive (+) value and a negative (−) value according to the total torque command (sum torque command), which is the torque command before distribution.

For example, in the co-directional distribution mode, in a situation where there is no accelerator position sensor value by the driver, that is, when the vehicle decelerates without pressing the accelerator pedal, both the front-wheel torque command and the rear-wheel torque command may be determined as negative (−) torque values.

Then, when the driver depresses the accelerator pedal to accelerate the vehicle, both the front-wheel torque command and the rear-wheel torque command are changed from a negative (−) torque value to a positive (+) torque value in the co-directional distribution mode. In the co-directional distribution mode, it is inevitable that both the front-wheel torque command and the rear-wheel torque command pass through the backlash band when the torque direction is changed.

Here, the sum of the front-wheel torque command and the rear-wheel torque command must follow the total torque command, and the front-wheel torque command and the rear-wheel torque command are determined through a normal front- and rear-wheel torque distribution process of distributing the total torque command according to the front- and rear-wheel distribution ratio.

As described above, while passing through the backlash band, even in a case where the driver depresses the accelerator pedal, the direction of the torque applied from the motor to the drive system does not change rapidly so that the backlash problem can be minimized.

That is, as can be seen in FIG. 4, in the co-directional distribution mode, the front-wheel torque command and rear-wheel torque command are not converted from negative (−) torque to positive (+) torque as soon as the driver depresses the accelerator pedal, and for a predetermined period of time after the acceleration pedal is depressed, the front-wheel torque command and the rear-wheel torque command are set so that the torque applied to the drive system by the motor can change direction while passing through the backlash band.

During this time passing through the backlash band, the torque slope control is performed to limit a slope (change rate) of the front-wheel torque command and the rear-wheel torque command, so that the torque command does not rapidly increase. In the case of the co-directional distribution mode, the backlash control is performed to ensure a smooth torque change in the backlash band for both the front-wheel torque command and the rear-wheel torque command.

To this end, a maximum allowable change rate in the backlash band for the front-wheel torque command and the rear-wheel torque command may be set to a small value that does not cause backlash shock in the controller 20.

Accordingly, while the front-wheel torque command and the rear-wheel torque command increase and pass through the backlash band, the front-wheel torque command and the rear-wheel torque command are determined as values that change smoothly according to the maximum allowable change rate of the small value in the controller 20.

In addition, the front-wheel torque command and the rear-wheel torque command after passing through the backlash band are determined to have sizes that can satisfy the driving torque necessary for acceleration through a normal front- and rear-wheel torque distribution process.

As described above, in the co-directional distribution mode, when the driver depresses the accelerator pedal to enter an acceleration situation, both the front-wheel torque command and the rear-wheel torque command are changed from a negative (−) torque value to a positive (+) torque value, and when the torque direction is changed, both the front-wheel torque command and the rear-wheel torque command pass through the backlash band.

In the co-directional distribution mode, in order to minimize the backlash problem, the backlash control is performed to limit the slope to the maximum allowable change rate while passing through the backlash band for both the front-wheel torque command and the rear-wheel torque command, so that the vehicle's acceleration delay is unavoidable.

Conversely, in a case where the driver releases the accelerator pedal (tip-out) after depressing the accelerator pedal, in the co-directional distribution mode, both the front-wheel torque command and the rear-wheel torque command are changed from a positive (+) torque value to a negative (−) torque value. In this way, even in a case where the torque direction is reversed, both the front-wheel torque command and the rear-wheel torque command inevitably pass through the backlash band.

Even though the regenerative torque is necessary for coasting deceleration driving after tip-out of the accelerator pedal, the direction of torque applied from the motor to the drive system does not change rapidly while passing through the backlash band to minimize the backlash problem.

That is, as can be seen in FIG. 4, the front-wheel torque command and the rear-wheel torque command do not change from positive (+) torque to negative (−) torque as soon as the driver releases the accelerator pedal (tip-out), and for a predetermined period of time after the tip-out of the accelerator pedal, the front-wheel torque command and the rear-wheel torque command are set so that the torque applied to the drive system by the motor can change direction while passing through the backlash band.

During this time of passing through the backlash band, the torque slope control is performed to limit the slope (change rate) of the front-wheel torque command and the rear-wheel torque command, so that the torque command is not rapidly reduced.

The backlash control is performed to ensure a smooth torque change in the backlash band for both the front-wheel torque command and the rear-wheel torque command. Here, the front-wheel torque command and the rear-wheel torque command are determined as values that change smoothly according to the maximum allowable change rate of the small value in the controller 20.

In addition, a normal front- and rear-wheel torque distribution process is performed to satisfy the regenerative torque necessary for coasting deceleration driving after passing the backlash band, and the front-wheel torque command and the rear-wheel torque command that can satisfy the regenerative torque command (torque command before distribution) that is a total torque command during coasting deceleration driving are determined, by the controller 20.

As described above, in the co-directional distribution mode, when the driver releases the accelerator pedal (tip-out) to enter a coasting deceleration situation, both the front-wheel torque command and the rear-wheel torque command are changed from a positive (+) torque value to a negative (−) torque, and when the torque direction is changed, both the front-wheel torque command and the rear-wheel torque command pass through the backlash band. Accordingly, it is inevitable that the deceleration delay occurs at the time of tip-out of the accelerator pedal.

The co-directional distribution mode may also be divided into a co-directional distribution mode in the acceleration direction and a co-directional distribution mode in the regenerative direction. In a case where the demand torque (sum demand torque) is in the positive (+) direction (vehicle driving direction), since the driving torque for vehicle acceleration must be generated, the co-directional distribution control in the acceleration direction is performed. In the co-directional distribution mode in the acceleration direction, the torque command for the front-wheel motor (front-wheel torque command) and the torque command for the rear-wheel motor (rear-wheel torque command) are both determined as torque commands in the positive (+) direction (driving direction).

Further, in a case where the demand torque (sum demand torque) is in the negative (−) direction (vehicle deceleration direction), since regenerative torque for vehicle deceleration must be generated, the co-directional distribution control in the regenerative direction is performed. In the co-directional distribution mode in the regenerative direction, the torque command for the front-wheel motor (front-wheel torque command) and the torque command for the rear-wheel motor (rear-wheel torque command) are both determined as torque commands in the negative (−) direction (deceleration direction).

In the co-directional distribution mode, after the front-wheel torque command and the rear-wheel torque command are determined through front- and rear-wheel torque distribution, post-processing may be performed on the determined front- and rear-wheel torque commands. Here, filter application and backlash relief torque correction are performed on the command, to thereby make it possible to determine the final front-wheel torque command and the final rear-wheel torque command.

Then, after the final front-wheel torque command and the final rear-wheel torque command are determined, the controller 20 controls the front-wheel motor 31 and the rear-wheel motor 41 according to the final front-wheel torque command and rear-wheel torque command.

In this way, in the present embodiment, the torque control mode of the vehicle may include the following four modes classified according to the vehicle driving states.

1) Reverse distribution in acceleration direction
2) Reverse distribution in regenerative direction
3) Co-directional distribution in acceleration direction
4) Co-directional distribution in regenerative direction The present embodiment proposes mode transition (switching) conditions and a method thereof for switching between modes, capable of securing the driving performance and drivability of an electric vehicle that is an application target in a state where the above-described four torque control modes are set.

Control for mode determination and switching between modes is performed by the controller 20 on the basis of vehicle driving information, where the vehicle driving information includes a pedal position sensor value that is driver's driving input information, and the pedal position sensor value includes an accelerator position sensor value (APS value) and a brake position sensor value (BPS value). The accelerator position sensor value and the brake position sensor value may be acquired from signals of the accelerator position sensor (APS) and the brake position sensor (BPS) of the driving information detector 10.

In the following description, "accelerator pedal on" and "brake pedal on" are defined as a state in which a driver presses each pedal and there is a pedal input, which is a pedal force applied state, that is, the accelerator pedal or the brake pedal is pressed.

In addition, "accelerator pedal off" and "brake pedal off" are defined as a state in which the driver does not depress the pedal and there is no pedal input, which is a state in which the pedal force is released, that is, the accelerator pedal and the brake pedal are released.

In the present embodiment, the accelerator pedal on/off state and the brake pedal on/off state may be recognized in real time by the controller 20 from signals from the accelerator position sensor and the brake position sensor of the driving information detector 10.

In the present embodiment, in a state where both the accelerator pedal and the brake pedal are off, and in a state where the driver depresses the accelerator pedal and the demand torque (command) according to the accelerator position sensor value is less than or equal to a preset mode switching threshold, the reverse distribution mode is selected by the controller 20.

Here, the demand torque may be the sum torque of the front-wheel torque and the rear-wheel torque as demand torque before distribution, and in this specification, the demand torque (command) necessary for vehicle driving and the total torque (command) are used with the same meaning.

In a state where both the accelerator pedal and the brake pedal are off, the reverse distribution mode in the regenerative direction is selected by the controller 20, and in a state where the accelerator pedal is on in which the driver depresses the accelerator pedal, but in a state where the demand torque is equal to or smaller than the mode switching threshold, the reverse distribution mode in the acceleration direction is selected by the controller 20.

In addition, when the driver depresses the accelerator pedal in a state where the reverse distribution mode in the regenerative direction is selected, the mode switches to the reverse distribution mode in the acceleration direction, and conversely, when the driver releases the accelerator pedal to be "accelerator pedal off" in a state where the reverse distribution mode in the acceleration direction is selected, the mode switches to the reverse distribution mode in the regenerative direction.

Further, until the demand torque corresponding to the accelerator position sensor value (APS value) reaches the mode switching threshold after switching from the reverse distribution mode in the regenerative direction to the reverse distribution mode in the acceleration direction, the reverse distribution mode in the acceleration direction is maintained. Accordingly, zero-crossing of the front-wheel torque and rear-wheel torque is not necessary.

Here, the mode switching threshold may be set to a positive (+) torque value. Additionally, the mode switching threshold may be a preset value within a demand torque value range that can be satisfied only by the torque of the rear-wheel motor.

In addition, regarding the mode switching threshold, a mode switching threshold for switching from the reverse distribution mode to the co-directional distribution mode, and conversely, a mode switching threshold for switching and re-entering from the co-directional distribution mode to the reverse distribution mode may be set to different values.

Further, when the demand torque for vehicle driving, that is, the demand torque corresponding to the accelerator position sensor value, exceeds the mode switching threshold, or when the driver depresses the brake pedal to be on, the reverse distribution mode ends and switches to the co-directional distribution mode by the controller 20.

In the present embodiment, when the torque necessary for vehicle driving in the reverse distribution mode in the acceleration direction, that is, the demand torque corresponding to the accelerator position sensor value, exceeds the mode switching threshold, the mode switches to the co-directional distribution mode in the acceleration direction by the controller 20.

Further, in the reverse distribution mode in the regenerative direction, when the driver depresses the brake pedal to be on, the mode switches to the co-directional distribution mode in the regenerative direction by the controller 20.

In addition, in a case where the demand torque decreases and becomes less than or equal to the mode switching threshold in the co-directional distribution mode in the acceleration direction, or in a case where the driver releases the brake pedal to be the off state in the co-directional distribution mode in the regenerative direction, the co-directional distribution mode ends and returns to the reverse distribution mode by the controller 20.

As described above, in switching from the co-directional distribution mode to the reverse distribution mode or from the reverse distribution mode to the co-directional distribution mode, zero-crossing occurs, and thus, it may be difficult to immediately perform the mode switching to cope with the range where the backlash shock occurs. However, this time delay is associated with the time taken from the driver releasing the brake pedal the depressing the accelerator pedal, thereby making it possible to provide natural drivability.

Additionally, in the present embodiment, in switching between the co-directional distribution mode and the reverse distribution mode, only zero-crossing of the motor torque of one of the front- and rear-wheels occurs, so that torque response delay caused by the zero-crossing may be compensated to a significant extent using the motor of the other thereof.

Meanwhile, the mode transition (switching) is accompanied by change in the slope of the torque command, and sudden mode switching has a high risk of deteriorating drivability and stability, and conversely, slow mode switching has a high risk of deteriorating responsiveness. Accordingly, it is important to set an appropriate slope in switching between modes.

In the present embodiment, the following three factors are mainly considered in determining the slope of torque.
1) Passing the backlash band
2) Shaft torsion due to compliance
3) Total torque (sum torque) failure direction error Here, the consideration of the above three factors to determine the slope limit value is effective only in a transient section during mode transition, and the slope limit value in states other than the transient section follows a separately preset value.

As described above, the determination and application of the slope limit value according to the present embodiment targets only the transient section during mode transition, and the slope limit in the present embodiment is applied only to the front-wheel torque command and the rear-wheel torque command during mode transition.

Figure 5:
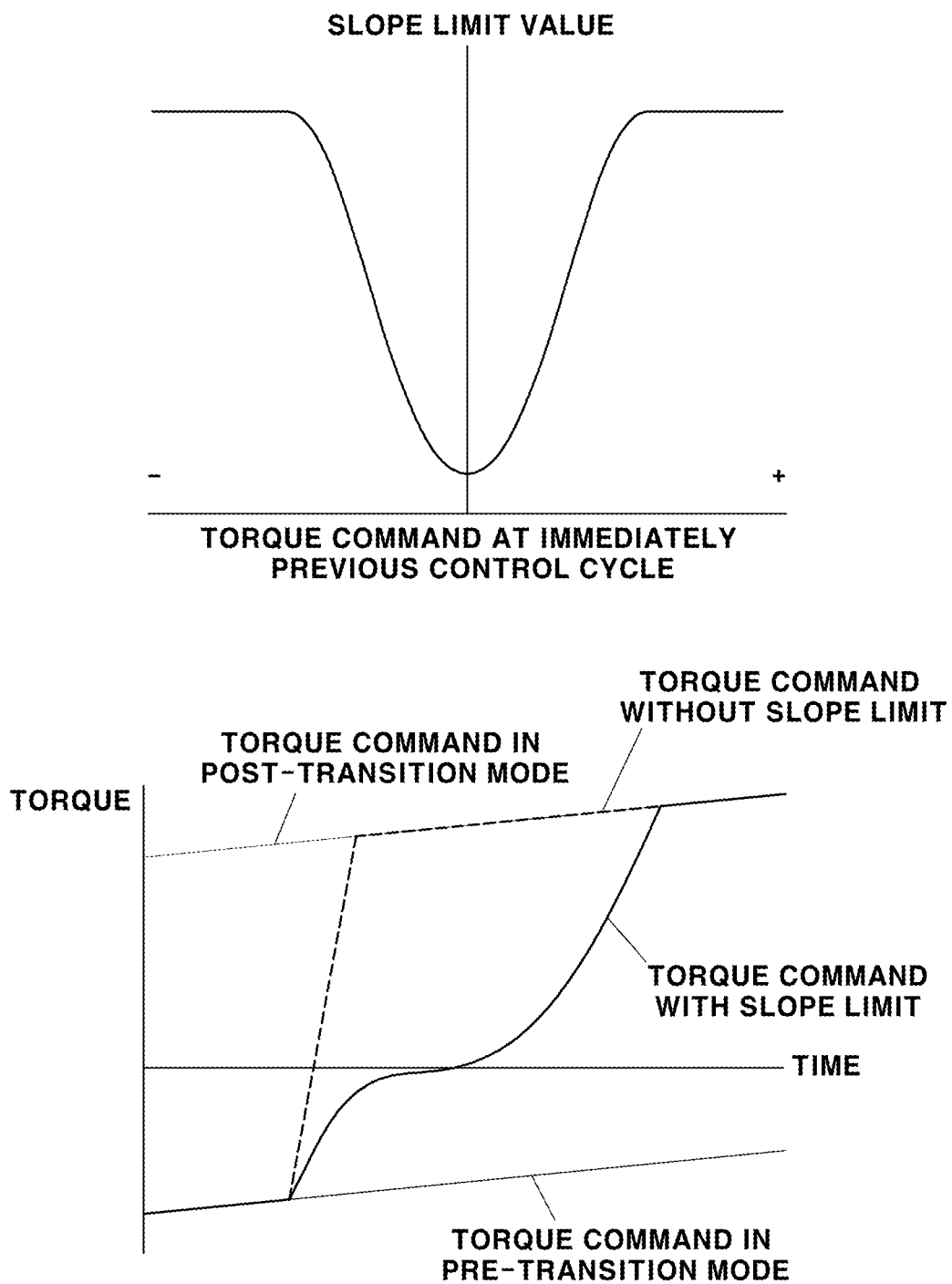
FIG. 5 is a diagram illustrating a torque slope limiting method in consideration of passing through a backlash band according to an embodiment of the present disclosure.

FIG. 5 is a diagram illustrating a torque slope limiting method in mode transition according to the present embodiment, in consideration of passing through a backlash band. In FIG. 5, a torque command in a pre-transition mode, a torque command in a post-transition mode, a torque command with slope limit applied during mode transition, and a torque command without slope limit applied are shown.

The torque command indicated by a dashed line in FIG. 5 represents a torque command to which no slope limit is applied. An upper part of FIG. 5 shows a slope limit value according to a torque command at an immediately previous control cycle, and is an example of the slope limit value set in the torque section including the backlash band.

In the present embodiment, in a case where the front-wheel torque command and the rear-wheel torque command pass through the backlash band that is a torque range including 0 torque in a transient section where the transition between the torque control modes is made, the controller performs limitation to a torque slope in consideration of passage through the backlash band of the front-wheel torque command or the rear-wheel torque command.

In addition, the controller determines a slope limit value corresponding to a torque value of the front-wheel torque command or the rear-wheel torque command at the immediately previous control cycle from setting data, and then, applies the determined slope limit value to perform the slope limitation with respect to the front-wheel torque command or the rear-wheel torque command in the transient section.

To this end, the setting data as shown in the upper part of FIG. 5, that is, setting data indicating a correlation between the torque command at the immediately previous control cycle and the slope limit value (absolute value), may be input and stored in advance in the controller in the form of a table or map.

The setting data is data in which a slope limit value corresponding to a torque value is set with respect to a torque range including the backlash band. In addition, in the setting data, the torque command (front-wheel torque command or the rear-wheel torque command) at the immediately previous control cycle is set as an input, and the slope limit value is set as an output. Accordingly, the controller may determine the slope limit value corresponding to the torque command at the immediately previous control cycle using the setting data in the torque section including the backlash band.

The torque command at the immediately previous control cycle in FIG. 5, that is, the torque command at the immediately previous control cycle that is the input of the setting data for determining the slope limit value, is the front-wheel torque command or the rear-wheel torque command.

Further, the torque command in the post-transition mode and the torque command in the pre-transition mode shown in the lower drawing of FIG. 5, and the torque command in the torque command with slope limit and the torque command without slope limit, also correspond to the front-wheel torque command or the rear-wheel torque command.

The slope of the torque command while passing through the backlash band must be adjusted to alleviate the backlash shock when passing through the zero-crossing or the backlash band in the transient section during mode transition.

Accordingly, the slope limit value in the backlash band is set to a value smaller than the slope limit value in the remaining torque section, and the slope limit value may be set so that the slope limit can be gradually alleviated as the distance from the backlash band increases after leaving the backlash band.

Referring to the upper part of FIG. 5, when the torque is near 0, the slope limit value is set to a minimum value, and as the torque moves away from 0, the slope limit value increases. As the torque moves away from 0, the slope limit is gradually alleviated and then is released.

Here, the torque for determining the slope limit value may be the front-wheel torque command or the rear-wheel torque command value at the immediately previous control cycle. In this way, after the slope limit value corresponding to the torque command at the immediately previous control cycle is determined from the torque command at the immediately previous control cycle, the front-wheel torque command and the rear-wheel torque command in the transient section during the mode transition are limited by the determined slope limit value.

In the present embodiment, the increase in the slope limit value (absolute value) means that the slope limit is alleviated or released, and the decrease in the slope limit value means that more slope limits are made.

Figure 6:
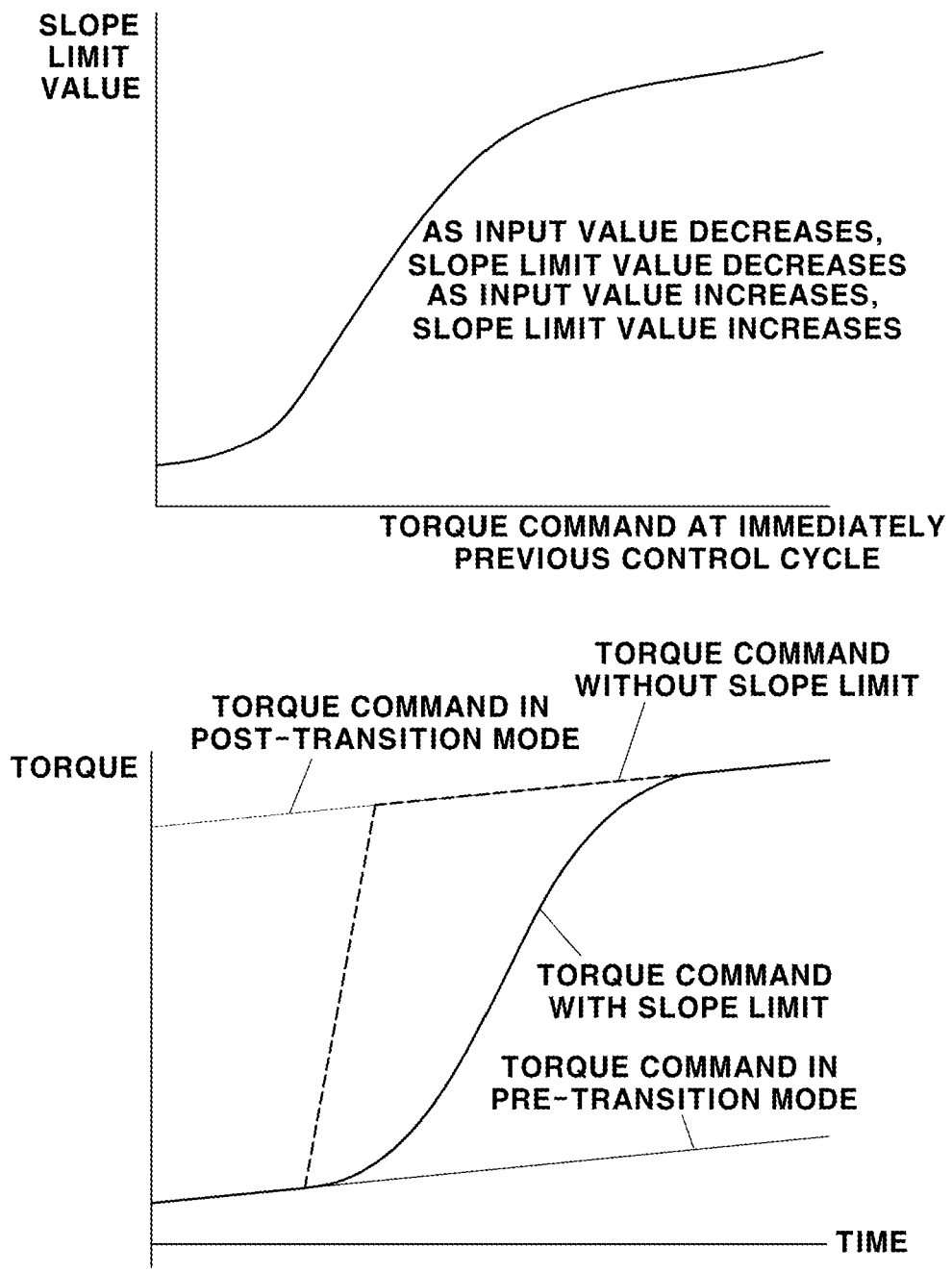
FIG. 6 is a diagram showing a torque slope limiting method in consideration of drive shaft torsion due to compliance according to an embodiment of the present disclosure.

FIG. 6 is a diagram showing a torque slope limiting method during mode transition according to an embodiment of the present disclosure, which illustrates a torque slope limiting method in consideration of shaft torsion due to compliance. Here, as a front-wheel torque command or a rear-wheel torque command, a torque command in a pre-transition mode, a torque command in a post-transition mode, and a torque command with slope limit applied during mode transition are shown together. The torque command indicated by a dashed line in FIG. 6 represents a torque command to which no slope limit is applied.

Here, the shaft torsion due to compliance includes torsion in a rotational direction of the drive system including the drive shaft, and deformation of a mount of the drive system. If such torsion occurs excessively, damage to the drive system and vibrational shock may occur, so the shaft torsion due to compliance should be limited as much as possible.

Here, since the speed of torsion mainly occurs in proportion to a change rate of torque, it is important to alleviate discontinuity in the slope of the torque command in order to prevent torsion.

Accordingly, rather than allowing the torque to suddenly start and end the transition during mode transition, it is advantageous that the torque gradually starts to transition and gradually converges on a target value. In order to apply the above-mentioned method, it is necessary to first determine a torque command value that is a starting point when starting the transition and a torque command value of the target to be converged upon completion of the transition. This may be determined by the torque command in the pre-transition mode and the torque command in the post-transition mode.

In addition, the slope limit value (in the following description, an absolute value regardless of an upward slope and a downward slope) may be determined from a table or map in which a minimum value of an absolute value of a difference between the torque command value in the pre-transition mode and a torque command value at the current time, and an absolute value of a difference between the torque command value in the post-transition mode and the torque command value at the current time is set as an input.

The table or map corresponds to setting data in which the correlation between the torque value as the minimum value of the two absolute values and the absolute value of the slope limit value is defined, and may be used to determine the absolute value of the slope limit value from the minimum value of the two absolute values after being input and stored in advance in the controller.

Here, in the table or map, it is advantageous that the absolute value of the slope limit value is set to a smaller value (slow change direction) as the torque value that is the minimum value among the two absolute values decreases and the absolute value of the slope limit value is set to a larger value (rapid change direction) as the torque value that is the minimum value among the two absolute values increases.

An upper diagram of FIG. 6 shows the correlation between the input and output of the table or map as the setting data, which shows an example of setting the slope limit value according to the minimum value of the two absolute values.

According to the diagram showing the slope limit value in FIG. 6, it can be seen that the smaller the torque value as the minimum value, the slope limit value is set to a value having a smaller absolute value, and the larger the torque value as the minimum value, the slope limit value is set to a value having a larger absolute value.

Figure 7:
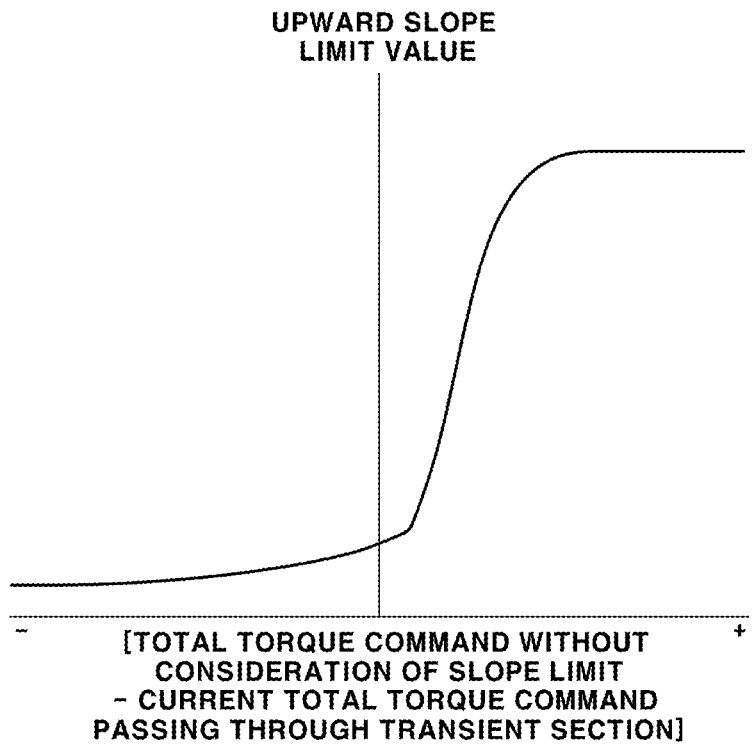
FIG. 7 is a diagram showing an example of setting a slope limit value (absolute value) according to a total torque command according to an embodiment of the present disclosure.
Figure 7:
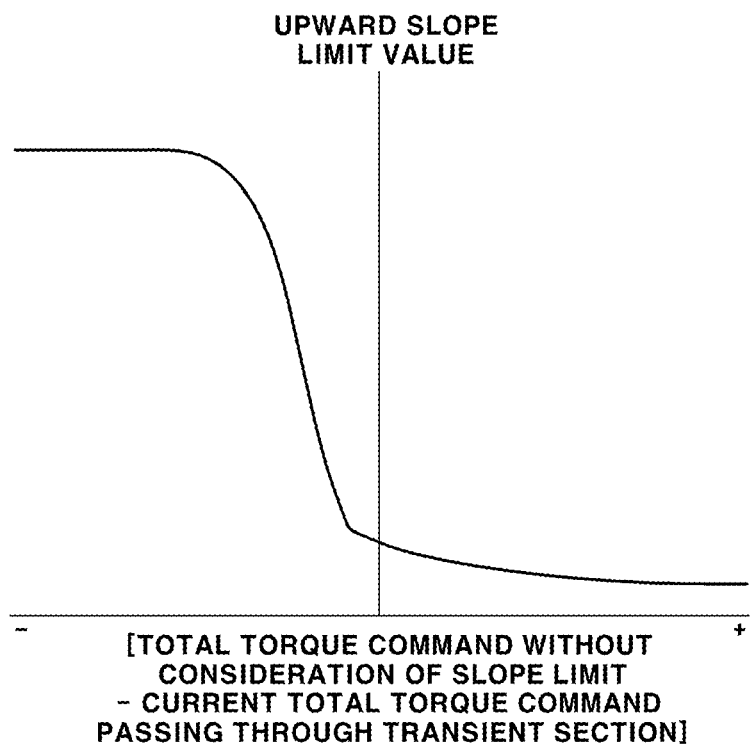

Hereinafter, a slope limiting method in consideration of a direction of a total torque failure error will be described. FIG. 7 is a diagram showing an example of setting a slope limit value (absolute value) corresponding to total torque according to an embodiment of the present disclosure, and FIG. 8 is a diagram illustrating a slope limit state during mode transition according to the embodiment of the present disclosure.

Figure 8:
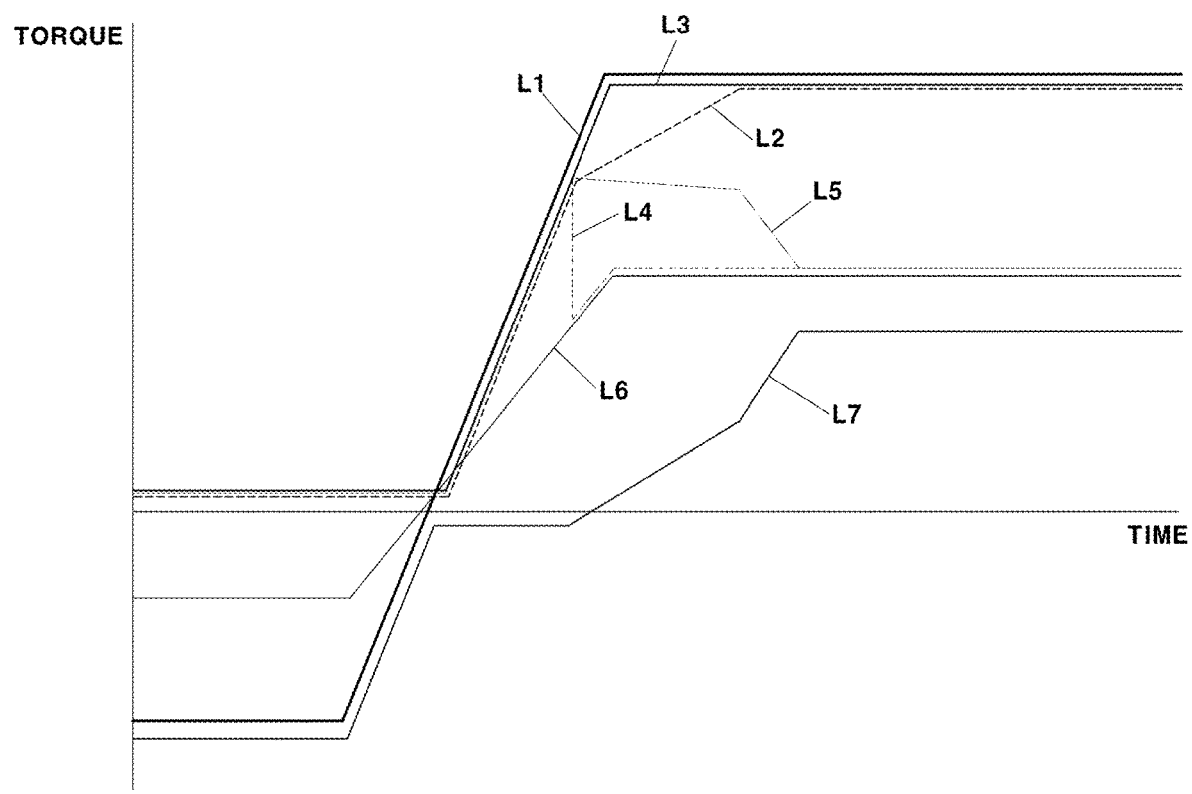
FIG. 8 is a diagram illustrating a slope limit state during mode transition in consideration of a direction of a total torque failure error according to an embodiment of the present disclosure.

FIG. 8 shows the slope limit state in consideration of the direction of the total torque failure error, in which a total torque command (L1) without considering slope limit, a sum torque value (L2) at an immediately previous control cycle passing through a transient section for mode transition, a rear-wheel torque command (L3) in a pre-transition mode, a rear-wheel torque command (L4) without slope limit applied, a rear-wheel torque command (L5) with slope limit applied, a rear-wheel torque command (L6) in a post-transition mode, a front-wheel torque command with slope limit applied (total torque failure cause) (L7) are shown.

When applying the slope limit in consideration of the direction of the total torque failure error, the slope limit value may be determined as a value corresponding to a value (=L1−L2) obtained by subtracting the sum torque value (L2) of the front-wheel torque command and the rear-wheel torque command at the immediately previous control cycle, passing through the transient section for mode transition, from the total torque command (L1) without considering the slope limit.

To this end, as shown in FIG. 7, setting data that defines a correlation between the subtracted value (=L1−L2) and the slope limit value may be input and stored in advance in the controller in the form of a table or map.

That is, using, as an input, the value (=L1−L2) obtained by subtracting the sum torque value (L2) at the immediately previous control cycle, passing through the transient section for mode transition, from the total torque command (L1) without considering the slope limit, the controller may determine a corresponding slope limit value from the setting data.

An upper diagram of FIG. 7 shows an example of setting an upward (increasing) slope state limit value representing a slope state in which a torque command to which the slope limit is to be applied, that is, the front-wheel torque command or the rear-wheel torque command, increases, that is, an upward (increasing) slope state, and a lower diagram of FIG. 7 shows an example of setting of a downward (decreasing) slope limit value representing a slope state in which the rear-wheel torque command or the front-wheel torque command decreases, that is, a downward (decreasing) slope state.

In a case where the subtracted value (=L1−L2) that is the input in the setting data is a negative (−) value, this corresponds to a state in which the sum torque value (L2) at the immediately previous control cycle exceeds the total torque command (L1) without considering the slope limit.

On the other hand, in a case where the subtracted value (=L1-L2) that is the input in the setting data is a positive (+) value, this corresponds to a state in which the sum torque value (L2) at the immediately previous control cycle does not reach the total torque command (L1) without considering the slope limit.

In the present embodiment, as can be seen in the upper diagram of FIG. 7, in the upward slope state, the upward slope limit value in the setting data may be set to a smaller value when the subtracted value (=L1-L2), which is the input of the setting data, is negative (-) than when it is positive (+).

In addition, as can be seen in the upper diagram of FIG. 7, in the upward slope state, the upward slope limit value in the setting data may be set to a larger value as the subtracted value (=L1-L2), which is the input of the setting data, increases.

As can be seen in the lower diagram of FIG. 7, in the downward slope state, the downward slope limit value (absolute value) in the setting data may be set to a larger value when the subtracted value (=L1-L2), which is the input of the setting data, is negative (-) than when it is positive (+).

In addition, as can be seen in the lower diagram of FIG. 7, in the downward slope state, the downward slope limit value (based on the absolute value) in the setting data may be set to a larger value as the subtracted value (=L1-L2), which is the input of the setting data, increases.

Regarding the slope limit in consideration of the direction of the total torque failure error, since the vehicle to which the present disclosure is applied has two axles (front- and rear-wheels), the slope limit of one shaft among the front-wheel axle and the rear-wheel axle must be considered at the other axle as necessary.

In other words, in a case where the slope of the torque command of one axle is limited for any reason, if this is ignored at the other axle and the slope limit converges to the target value through a steep slope, the result of the sum torque command of the two axles may be different from an intended sum torque command (total torque command), which may cause problems in being incapable of following the desired sum torque.

Accordingly, in order to prevent the problem, it is possible to calculate the slope limit value using a direction of an error between the sum torque value of the front-wheel torque command and the rear-wheel torque command, passing through the transient state and section, at the immediately previous control cycle, and the total torque command without considering the slope limit.

In other words, in a case where [total torque command without consideration of slope limit—sum torque value of torque commands passing through transient section] is a positive (+) value, the increasing (upward) slope limit value is set to be a larger value and the decreasing (downward) slope limit value is set to be a smaller value, compared with the case of a negative (-) value. Conversely, when [total torque command without consideration of slope limit—sum torque value of torque commands passing through transient section] is the negative (-) value, the increasing (upward) slope limit value is set to be a smaller value and the decreasing (downward) slope limit value is set to be a larger value, compared with the case of the positive (+) value.

Further, in the present disclosure, a plurality of slope limit values may be calculated considering various factors. Here, the most conservative (slowest change direction) slope limit is applied to the increasing and decreasing slope limits, respectively. That is, the minimum value among the calculated slope limit values is selected and used as the final torque slope limit value.

Figure 9:
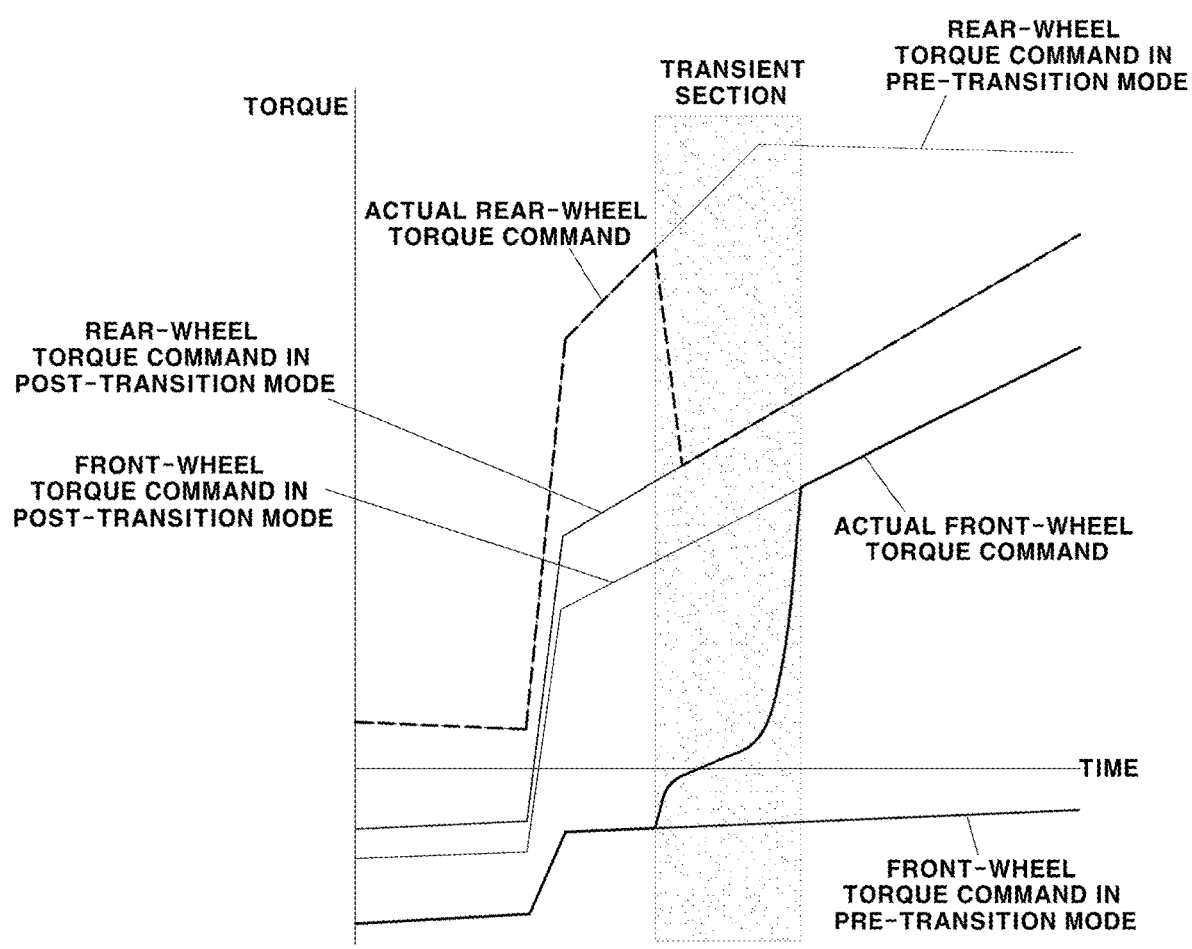
FIG. 9 shows an example of applying slope limitation considering passage through a backlash band.
Figure 10:
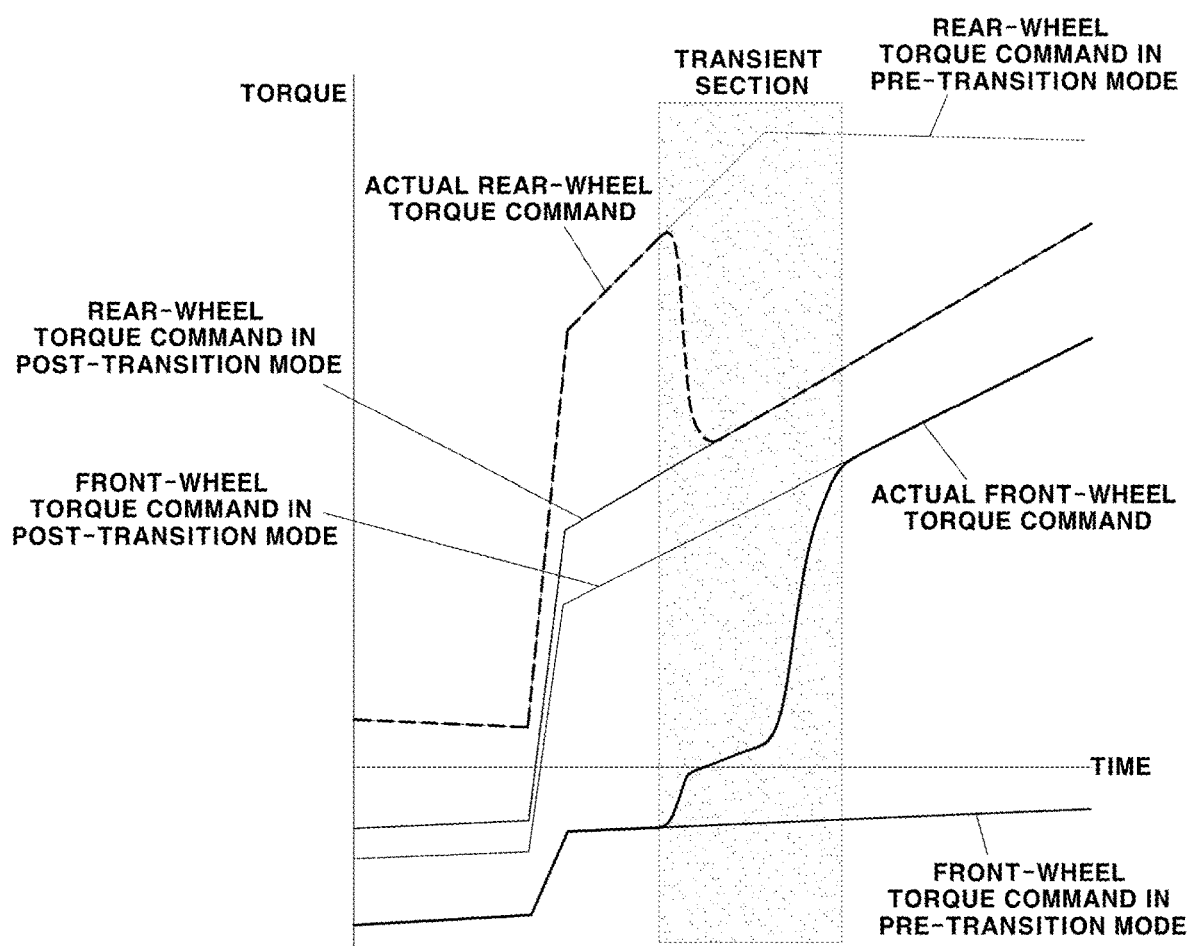
FIG. 10 shows an example of applying slope limitation considering the passage through the backlash band and shaft torsion due to compliance.
Figure 11:
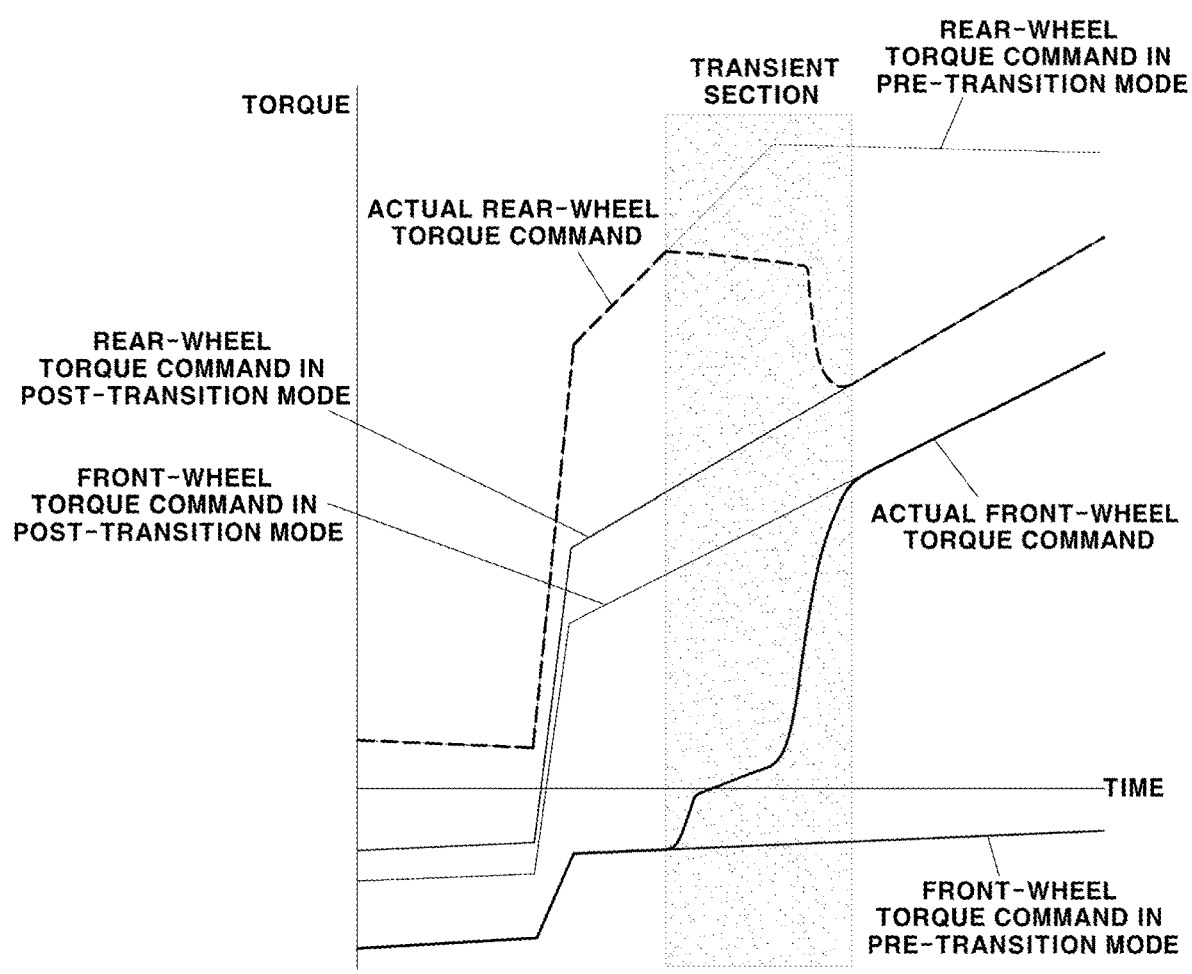
FIG. 11 shows an example of slope limitation considering the passage through the backlash band, the shaft torsion due to compliance, and a total torque failure error direction.

FIG. 9 to FIG. 11 are diagrams illustrating slope limitation states in which three factors are selectively considered, and show an example of a transition from the reverse distribution mode to the co-directional distribution mode.

In FIG. 9 to FIG. 11, targets of slope limitation are the front-wheel torque command and the rear-wheel torque command, and an actual front-wheel torque command and an actual rear-wheel torque command are torque commands whose slope is limited by a slope limit value.

FIG. 9 shows an example of applying slope limitation considering passage through a backlash band, and FIG. 10 shows an example of applying slope limitation considering the passage through the backlash band and shaft torsion due to compliance.

FIG. 11 shows an example of slope limitation considering the passage through the backlash band, the shaft torsion due to compliance, and a total torque failure error direction.

According to the embodiment of the present disclosure, in the transition section where transition between torque control modes occurs, when the front-wheel torque command or the rear-wheel torque command passes through the backlash band that is the torque range including 0 torque, the controller may determine a first slope limit value for limitation to a torque slope in consideration of passage through the backlash band of the front-wheel torque command or the rear-wheel torque command, a second slope limit value for limitation to the torque slope in consideration of the shaft torsion due to compliance, using the torque command in the pre-transition mode and the torque command in the post-transition mode as the front-wheel torque command or the rear-wheel torque command, and a third slope limit value for limitation to the torque slope in consideration of the direction of the total torque failure error, on the basis of the total torque command without considering the slope limit and the sum torque value of the front-wheel torque command and the rear-wheel torque command, passing through the transient section, at the immediately previous control cycle, and may perform limitation to the slope with respect to the front-wheel torque command or the rear-wheel torque command using the smallest slope limit value among the three determined slope limit values.

In addition, according to the embodiment of the present disclosure, the controller may determine only two predetermined slope limit values among the first slope limit value, the second slope limit value, and the third slope limit value, and then, may perform limitation to the slope with respect to the front-wheel torque command or the rear-wheel torque command using a smaller value among the two determined slope limit values.

According to the torque control method in the drive system of the electric vehicle according to the present disclosure, it is possible to prevent the occurrence of backlash by using a motor only in a torque range unrelated to the backlash in the reverse distribution mode.

According to the present disclosure, it is possible to effectively solve backlash vibration, noise, and shock problems, to perform motor control specialized for a high-performance driving mode, to improve vehicle turning performance, and to generate torque without concern about the backlash problems, thereby making it possible to enhance longitudinal responsiveness.

According to the present disclosure, it is possible to provide a driving mode that emphasizes direct connection feeling exclusively for high-performance electric vehicles, to improve the convenience and accuracy of load movement control when turning on a track, and to improve the ease of use of special driving modes such as a drift mode.

According to the present disclosure, it is possible to provide an optimal method for automatically switching between distribution modes, thereby solving the problems of a reactivity limit in the co-directional distribution mode and an output limit in the reverse distribution mode.

In particular, by performing appropriate torque slope control in the mode transition section, it is possible to secure drivability in the mode transition section, and to minimize decrease in responsiveness in the mode transition section.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

The invention claimed is:

1. A torque control method in a drive system of an electric vehicle comprising:
   determining, by a controller, a torque control mode corresponding to a current vehicle driving state among a plurality of preset torque control modes; and
   transitioning, by the controller, from a current torque control mode to the determined torque control mode;
   wherein the transitioning to the determined torque control mode comprises performing, by the controller, limitation to a torque slope using a torque command at an immediately previous control cycle with respect to a front-wheel torque command that is a command for a front-wheel motor and a rear-wheel torque command that is a command for a rear-wheel motor, in a transient section where transition between the torque control modes occurs.

2. The method according to claim 1, wherein the plurality of torque control modes comprises:
   a co-directional distribution mode where both the front-wheel torque command and the rear-wheel torque command are determined as a negative (−) torque value corresponding to torque in a motor regenerative direction, or where both the front-wheel torque command and the rear-wheel torque command are determined as a positive (+) torque value corresponding to torque in a motor driving direction; and
   a reverse distribution mode where the front-wheel torque command and the rear-wheel torque command are determined as torque values in opposite directions among the negative (−) torque value corresponding to the torque in the motor regenerative direction and the positive (+) torque value corresponding to the torque in the motor driving direction.

3. The method according to claim 2, wherein the reverse distribution mode is a mode in which the front-wheel torque command is determined as the negative (−) torque value and the rear-wheel torque command is determined as the positive (+) torque value.

4. The method according to claim 2, wherein the reverse distribution mode is a mode in which the front-wheel torque command is determined as a value that is less than or equal to a maximum front-wheel torque threshold set as a negative (−) torque value, and the rear-wheel torque command is determined as a value that is equal to or greater than a minimum rear-wheel torque threshold set as a positive (+) torque value.

5. The method according to claim 2, wherein the reverse distribution mode comprises:
   a reverse distribution mode in an acceleration direction where the front-wheel torque command is determined as the maximum front-wheel torque threshold set as the negative (−) torque value and the rear-wheel torque command is determined as the positive (+) torque value; and
   a reverse distribution mode in a regenerative direction where the front-wheel torque command is determined as the minimum rear-wheel torque threshold set as the positive (+) torque value and the front-wheel torque command is determined as the negative (−) torque value.

6. The method according to claim 5, wherein in the reverse distribution mode, the front-wheel torque command and the rear-wheel torque command are determined so that a sum torque value of the front-wheel torque command and the rear-wheel torque command follows a total torque command necessary for vehicle driving.

7. The method according to claim 1, wherein in the transient section where the transition between the torque control modes is made, when the front-wheel torque command or the rear-wheel torque command passes through a backlash band that is a torque range including 0 torque, the controller performs limitation to a torque slope in consideration of passage of the front-wheel torque command or the rear-wheel torque command through the backlash band.

8. The method according to claim 7, wherein in performing the limitation to the torque slope in consideration of the passage through the backlash band, the controller determines a slope limit value corresponding to a torque value of a front-wheel torque command or a rear-wheel torque command at the immediately previous control cycle from setting data, and applies the determined slope limit value to perform limitation to the slope with respect to the front-wheel torque command or the rear-wheel torque command in the transient section, and in the setting data, a slope limit value corresponding to a torque value is set with respect to the torque range including the backlash band.

9. The method according to claim 8, wherein the slope limit value corresponding to the 0 torque is set to a value having a minimum absolute value, in the setting data, and an absolute value of the slope limit value corresponding to the torque value is set to a larger value, as the torque value becomes more distant from the 0 torque, in the torque range including the backlash band.

10. The method according to claim 1, wherein in the transient section where transition between the torque control modes occurs, the controller performs the limitation to the torque slope in consideration of shaft torsion due to compliance, using a torque command in a pre-transition mode and a torque command in a post-transition mode as the front-wheel torque command or the rear-wheel torque command.

11. The method according to claim 10, wherein in performing the limitation to the torque slope in consideration of the shaft torsion due to compliance, the controller determines, from setting data, a slope limit value corresponding to a minimum value among an absolute value of a difference between the torque command in the pre-transition mode as the front-wheel torque command or the rear-wheel torque command and the torque command at the immediately previous control cycle, and an absolute value of a difference between the torque command in the post-transition mode and the torque command at the immediately previous control cycle, and applies the determined slope limit value to perform the limitation to the slope with respect to the front-wheel torque command or the rear-wheel torque command in the transient section.

12. The method according to claim 11, wherein in the setting data, the slope limit value corresponding to the torque value as the minimum value is set, and an absolute value of the slope limit value is set to a larger value, as the torque value that is the minimum value increases.

13. The method according to claim 1, wherein in the transient section where the transition between the torque control modes is made, the controller performs the limitation to the torque slope in consideration of a direction of a total torque failure error, based on a total torque command without considering the slope limit and a sum torque value of the front-wheel torque command and the rear-wheel torque command, passing through the transient section, at the immediately previous control cycle.

14. The method according to claim 13, wherein in performing the limitation to the torque slope in consideration of the direction of the total torque failure error, the controller determines, from setting data, a slope limit value corresponding to a value obtained by subtracting the sum torque value of the front-wheel torque command and the rear-wheel torque command, passing through the transient section, at the immediately previous control cycle, from the total torque command without considering the slope limit, and applies the determined slope limit value to perform the limitation to the slope with respect to the front-wheel torque command or the rear-wheel torque command in the transient section.

15. The method according to claim 14, wherein in the setting data, in a case where the torque command to which the slope limit is applied, as the front-wheel torque command or the rear-wheel torque command, shows a gradually increasing slope state, the slope limit value when the torque value as the subtracted value is negative (−) is set to a value smaller than the slope limit value when the torque value as the subtracted value is positive (+), and as the torque value as the subtracted value decreases, the slope limit value is set to a smaller value.

16. The method according to claim 14, wherein in the setting data, in a case where the torque command to which the slope limit is applied, as the front-wheel torque command or the rear-wheel torque command, shows a gradually decreasing slope state, the slope limit value when the torque value as the subtracted value is negative (−) is set to a value larger than the slope limit value when the torque value as the subtracted value is positive (+), and as the torque value as the subtracted value decreases, the slope limit value is set to a larger value.

17. The method according to claim 1, wherein the controller determines, in a transition section where transition between the torque control modes occurs, in a case where the front-wheel torque command or the rear-wheel torque command passes through a backlash band that is a torque range including 0 torque, a first slope limit value for limiting the torque slope in consideration of the passage through the backlash band of the front-wheel torque command or the rear-wheel torque command, and a second slope limit value for limiting the torque slope in consideration of shaft torsion due to compliance, using a torque command in a pre-transition mode and a torque command in a post-transition mode as the front-wheel torque command or the rear-wheel torque command, and performs the limitation to the slope with respect to the front-wheel torque command or the rear-wheel torque command using a smaller slope limit value among the first and second slope limit values.

18. The method according to claim 1, wherein the controller determines, in a transition section where transition between the torque control modes occurs, in a case where the front-wheel torque command or the rear-wheel torque command passes through a backlash band that is a torque range including 0 torque, a first slope limit value for limiting the torque slope in consideration of the passage through the backlash band of the front-wheel torque command or the rear-wheel torque command, and a second slope limit value for limiting the torque slope in consideration of a direction of a total torque failure error, based on a total torque command without considering the slope limit and a sum torque value of the front-wheel torque command and the rear-wheel torque command, passing through the transient section, at the immediately previous control cycle, and performs the limitation to the slope with respect to the front-wheel torque command or the rear-wheel torque command using a smaller slope limit value among the first and second slope limit values.

19. The method according to claim 1, wherein the controller determines, in a transition section where transition between the torque control modes occurs, a first slope limit value for limiting the torque slope in consideration of shaft torsion due to compliance, using a torque command in a pre-transition mode and a torque command in a post-transition mode as the front-wheel torque command or the rear-wheel torque command, and a second slope limit value for limiting the torque slope in consideration of a direction of a total torque failure error, based on a total torque command without considering the slope limit and a sum torque value of the front-wheel torque command and the rear-wheel torque command, passing through the transient section, at the immediately previous control cycle, and performs the limitation to the slope with respect to the front-wheel torque command or the rear-wheel torque command using a smaller slope limit value among the first and second slope limit values.

20. The method according to claim 1, wherein the controller determines, in a transition section where transition between the torque control modes occurs, in a case where the front-wheel torque command or the rear-wheel torque command passes through a backlash band that is a torque range including 0 torque, a first slope limit value for limiting the torque slope in consideration of the passage through the backlash band of the front-wheel torque command or the rear-wheel torque command, a second slope limit value for limiting the torque slope in consideration of shaft torsion due to compliance, using a torque command in a pre-transition mode and a torque command in a post-transition mode as the front-wheel torque command or the rear-wheel torque command, and a third slope limit value for limiting the torque slope in consideration of a direction of a total torque failure error, based on a total torque command without considering the slope limit and a sum torque value of the front-wheel torque command and the rear-wheel torque command, passing through the transient section, at the immediately previous control cycle, and performs the limitation to the slope with respect to the front-wheel torque command or the rear-wheel torque command using the smallest slope limit value among the first, second, and third slope limit values.

* * * * *